(12) United States Patent
Donovan

(10) Patent No.: US 12,140,703 B2
(45) Date of Patent: Nov. 12, 2024

(54) VCSEL ARRAY LIDAR TRANSMITTER WITH SMALL ANGULAR DIVERGENCE

(71) Applicant: OPSYS Tech Ltd., Holon (IL)

(72) Inventor: Mark J. Donovan, Mountain View, CA (US)

(73) Assignee: OPSYS Tech Ltd., Holon (IL)

( * ) Notice: Subject to any disclaimer, the term of this patent is extended or adjusted under 35 U.S.C. 154(b) by 0 days.

(21) Appl. No.: 18/350,725

(22) Filed: Jul. 11, 2023

(65) Prior Publication Data

US 2023/0350027 A1 Nov. 2, 2023

Related U.S. Application Data

(63) Continuation of application No. 17/164,773, filed on Feb. 1, 2021, now Pat. No. 11,740,331, which is a
(Continued)

(51) Int. Cl.
 *G01S 7/481* (2006.01)
 *G01S 17/06* (2006.01)
 (Continued)

(52) U.S. Cl.
 CPC ............ *G01S 7/4815* (2013.01); *G01S 17/06* (2013.01); *G01S 17/89* (2013.01); *G01S 17/931* (2020.01)

(58) Field of Classification Search
 CPC .... G01S 7/4868; G01S 7/4815; G01S 7/4876; G01S 7/4863; G01S 7/484; G01S 7/499;
 (Continued)

(56) References Cited

U.S. PATENT DOCUMENTS

| 5,157,257 A | 10/1992 | Geiger |
| 5,552,893 A | 9/1996 | Akasu |

(Continued)

FOREIGN PATENT DOCUMENTS

| CN | 1512946 A | 7/2004 |
| CN | 101013030 A | 8/2007 |

(Continued)

OTHER PUBLICATIONS

International Search Report and Written Opinion received for PCT Patent Application No. PCT/EP2016/077499, mailed on Feb. 14, 2017, 22 pages (9 pages of English Tanslation and 13 pages of Official Copy).

(Continued)

*Primary Examiner* — Hoa Q Pham
(74) *Attorney, Agent, or Firm* — Rauschenbach Patent Law Group, PLLC; Kurt Rauschenbach

(57) ABSTRACT

A LIDAR transmitter includes a first transmitter array attached to a substrate and configured to generate a first array of laser beams. A first lens is positioned in an optical path of the first array of laser beams and configured to converge the first array of laser beams along the optical path. A second lens converges the first array of laser beams, wherein a position of a center of the second lens has a first radial offset from a center of the first transmitter array. A second transmitter array is attached to the substrate with a lateral offset from the first transmitter array and configured to generate a second array of laser beams. A third lens is configured to converge the second array of laser beams along the optical path. A fourth lens converges the second array of laser beams, wherein a position of a center of the fourth lens has a second radial offset from a center of the second transmitter array. The lateral offset, the first radial (Continued)

offset, and the second radial offset are chosen to provide a desired beam pattern at a target range.

16 Claims, 15 Drawing Sheets

Related U.S. Application Data continuation of application No. 16/686,163, filed on Nov. 17, 2019, now Pat. No. 10,928,486, which is a continuation of application No. 16/028,774, filed on Jul. 6, 2018, now Pat. No. 10,514,444.

(60) Provisional application No. 62/538,149, filed on Jul. 28, 2017.

(51) Int. Cl.
G01S 17/89 (2020.01)
G01S 17/931 (2020.01)

(58) Field of Classification Search
CPC ........ G01S 17/936; G01S 17/06; G01S 17/10; G01S 7/4811; G01S 7/87; G01S 17/42; G01S 7/4817; G01S 7/4814; G01S 7/4816; G01S 7/4812; G01S 17/87; G01S 17/89; G02B 13/0005; G02B 13/22; G02B 13/004; G02B 13/0045; G02B 13/16; G01B 13/14; G01B 11/24
USPC .. 356/601–623, 5.14, 5.11, 4.01, 5.15, 5.01; 250/341.1, 353
See application file for complete search history.

(56) References Cited

U.S. PATENT DOCUMENTS

| | | |
|---|---|---|
| 5,909,296 A | 6/1999 | Tsacoyeanes |
| 6,057,909 A | 5/2000 | Yahav et al. |
| 6,061,001 A | 5/2000 | Sugimoto |
| 6,246,708 B1 | 6/2001 | Thornton et al. |
| 6,353,502 B1 | 3/2002 | Marchant et al. |
| 6,680,788 B1 | 1/2004 | Roberson et al. |
| 6,717,972 B2 | 4/2004 | Steinle et al. |
| 6,775,480 B1 | 8/2004 | Goodwill |
| 6,788,715 B1 | 9/2004 | Leeuwen et al. |
| 6,829,439 B1 | 12/2004 | Sidorovich et al. |
| 6,860,350 B2 | 3/2005 | Beuhler et al. |
| 6,888,871 B1 | 5/2005 | Zhang et al. |
| 7,065,112 B2 | 6/2006 | Ghosh et al. |
| 7,110,183 B2 | 9/2006 | Von Freyhold et al. |
| 7,544,945 B2 | 6/2009 | Tan et al. |
| 7,652,752 B2 | 1/2010 | Fetzer et al. |
| 7,702,191 B1 | 4/2010 | Geron et al. |
| 7,746,450 B2 | 6/2010 | Willner et al. |
| 7,773,204 B1 | 8/2010 | Nelson |
| 7,969,558 B2 | 6/2011 | Hall |
| 8,072,581 B1 | 12/2011 | Breiholz |
| 8,115,909 B2 | 2/2012 | Behringer et al. |
| 8,247,252 B2 | 8/2012 | Gauggel et al. |
| 8,301,027 B2 | 10/2012 | Shaw et al. |
| 8,576,885 B2 | 11/2013 | van Leeuwen et al. |
| 8,675,181 B2 | 3/2014 | Hall |
| 8,675,706 B2 | 3/2014 | Seurin et al. |
| 8,783,893 B1 | 7/2014 | Seurin et al. |
| 8,824,519 B1 | 9/2014 | Seurin et al. |
| 9,038,883 B2 | 5/2015 | Wang et al. |
| 9,048,633 B2 | 6/2015 | Gronenborn et al. |
| 9,268,012 B2 | 2/2016 | Ghosh et al. |
| 9,285,477 B1 | 3/2016 | Smith et al. |
| 9,348,018 B2 | 5/2016 | Eisele et al. |
| 9,360,554 B2 | 6/2016 | Retterath et al. |
| 9,378,640 B2 | 6/2016 | Mimeault et al. |
| 9,392,259 B2 | 7/2016 | Borowski |
| 9,516,244 B2 | 12/2016 | Borowski |
| 9,520,696 B2 | 12/2016 | Wang et al. |
| 9,553,423 B2 | 1/2017 | Chen et al. |
| 9,560,339 B2 | 1/2017 | Borowski |
| 9,574,541 B2 | 2/2017 | Ghosh et al. |
| 9,575,184 B2 | 2/2017 | Gilliland et al. |
| 9,658,322 B2 | 5/2017 | Lewis |
| 9,674,415 B2 | 6/2017 | Wan et al. |
| 9,791,557 B1 | 10/2017 | Wyrwas et al. |
| 9,841,495 B2 | 12/2017 | Campbell et al. |
| 9,857,468 B1 | 1/2018 | Eichenholz et al. |
| 9,933,513 B2 | 4/2018 | Dussan et al. |
| 9,946,089 B2 | 4/2018 | Chen et al. |
| 9,989,406 B2 | 6/2018 | Pacala et al. |
| 9,989,629 B1 | 6/2018 | LaChapelle |
| 9,992,477 B2 | 6/2018 | Pacala et al. |
| 10,007,001 B1 | 6/2018 | LaChapelle et al. |
| 10,063,849 B2 | 8/2018 | Pacala et al. |
| 10,191,156 B2 | 1/2019 | Steinberg et al. |
| 10,295,660 B1 | 5/2019 | McMichael et al. |
| 10,488,492 B2 | 11/2019 | Hamel et al. |
| 10,514,444 B2 | 12/2019 | Donovan |
| 10,761,195 B2 | 9/2020 | Donovan |
| 10,775,485 B2 * | 9/2020 | Shim ................. G02B 26/0833 |
| 10,928,486 B2 | 2/2021 | Donovan |
| 11,016,178 B2 | 5/2021 | Donovan |
| 11,061,234 B1 | 7/2021 | Zhu et al. |
| 11,320,538 B2 | 5/2022 | Donovan et al. |
| 11,513,195 B2 | 11/2022 | Donovan et al. |
| 11,740,331 B2 * | 8/2023 | Donovan .............. G01S 17/894 356/3 |
| 11,762,068 B2 * | 9/2023 | Donovan ................ G01S 7/484 356/5.01 |
| 2002/0117340 A1 | 8/2002 | Stettner |
| 2002/0195496 A1 | 12/2002 | Tsikos et al. |
| 2003/0043363 A1 | 3/2003 | Jamieson et al. |
| 2003/0147652 A1 | 8/2003 | Green et al. |
| 2004/0120717 A1 | 6/2004 | Clark et al. |
| 2004/0228375 A1 | 11/2004 | Ghosh et al. |
| 2005/0025211 A1 | 2/2005 | Zhang et al. |
| 2005/0180473 A1 | 8/2005 | Brosnan |
| 2005/0232628 A1 | 10/2005 | von Freyhold et al. |
| 2006/0132752 A1 | 6/2006 | Kane |
| 2006/0231771 A1 | 10/2006 | Lee et al. |
| 2006/0244978 A1 | 11/2006 | Yamada et al. |
| 2007/0024849 A1 | 2/2007 | Carrig et al. |
| 2007/0071056 A1* | 3/2007 | Chen ...................... G01S 17/87 372/50.124 |
| 2007/0091960 A1 | 4/2007 | Gauggel et al. |
| 2007/0131842 A1 | 6/2007 | Ernst |
| 2007/0177841 A1 | 8/2007 | Danziger |
| 2007/0181810 A1 | 8/2007 | Tan et al. |
| 2007/0219720 A1 | 9/2007 | Trepagnier et al. |
| 2008/0074640 A1 | 3/2008 | Walsh et al. |
| 2008/0186470 A1 | 8/2008 | Hipp |
| 2009/0027651 A1 | 1/2009 | Pack et al. |
| 2009/0140047 A1 | 6/2009 | Yu et al. |
| 2009/0161710 A1 | 6/2009 | Hoashi et al. |
| 2009/0273770 A1 | 11/2009 | Bauhahn et al. |
| 2009/0295986 A1 | 12/2009 | Topliss et al. |
| 2010/0046953 A1 | 2/2010 | Shaw et al. |
| 2010/0215066 A1 | 8/2010 | Mordaunt et al. |
| 2010/0271614 A1 | 10/2010 | Albuquerque et al. |
| 2010/0302528 A1 | 12/2010 | Hall |
| 2011/0176567 A1 | 7/2011 | Joseph |
| 2011/0216304 A1 | 9/2011 | Hall |
| 2012/0038903 A1 | 2/2012 | Weimer et al. |
| 2013/0163626 A1 | 6/2013 | Seurin et al. |
| 2013/0163627 A1 | 6/2013 | Seurin et al. |
| 2013/0206967 A1 | 8/2013 | Shpunt et al. |
| 2013/0208256 A1 | 8/2013 | Mamidipudi et al. |
| 2013/0208753 A1 | 8/2013 | van Leeuwen et al. |
| 2014/0043309 A1 | 2/2014 | Go et al. |
| 2014/0049610 A1 | 2/2014 | Hudman et al. |
| 2014/0071427 A1 | 3/2014 | Last |
| 2014/0111812 A1 | 4/2014 | Baeg et al. |
| 2014/0139467 A1 | 5/2014 | Ghosh et al. |
| 2014/0160341 A1 | 6/2014 | Tickoo et al. |
| 2014/0218898 A1 | 8/2014 | Seurin et al. |

(56) References Cited

U.S. PATENT DOCUMENTS

| | | |
|---|---|---|
| 2014/0247841 A1 | 9/2014 | Seurin et al. |
| 2014/0267701 A1 | 9/2014 | Aviv et al. |
| 2014/0303829 A1 | 10/2014 | Lombrozo et al. |
| 2014/0312233 A1 | 10/2014 | Mark et al. |
| 2014/0333995 A1 | 11/2014 | Seurin et al. |
| 2014/0350836 A1 | 11/2014 | Stettner et al. |
| 2014/0376092 A1 | 12/2014 | Mor |
| 2015/0055117 A1 | 2/2015 | Pennecot et al. |
| 2015/0069113 A1 | 3/2015 | Wang et al. |
| 2015/0097947 A1 | 4/2015 | Hudman et al. |
| 2015/0103358 A1 | 4/2015 | Flascher |
| 2015/0109603 A1 | 4/2015 | Kim et al. |
| 2015/0123995 A1 | 5/2015 | Zavodny et al. |
| 2015/0131080 A1 | 5/2015 | Retterath et al. |
| 2015/0160341 A1 | 6/2015 | Akatsu et al. |
| 2015/0219764 A1 | 8/2015 | Lipson |
| 2015/0255955 A1 | 9/2015 | Wang et al. |
| 2015/0260830 A1 | 9/2015 | Ghosh et al. |
| 2015/0260843 A1 | 9/2015 | Lewis |
| 2015/0311673 A1 | 10/2015 | Wang et al. |
| 2015/0316368 A1 | 11/2015 | Moench et al. |
| 2015/0340841 A1 | 11/2015 | Joseph |
| 2015/0362585 A1 | 12/2015 | Ghosh et al. |
| 2015/0377696 A1 | 12/2015 | Shpunt et al. |
| 2015/0378023 A1 | 12/2015 | Royo Royo et al. |
| 2016/0003946 A1 | 1/2016 | Gilliland et al. |
| 2016/0006914 A1 | 1/2016 | Neumann |
| 2016/0025842 A1 | 1/2016 | Anderson et al. |
| 2016/0025993 A1 | 1/2016 | Mor et al. |
| 2016/0033642 A1 | 2/2016 | Fluckiger |
| 2016/0072258 A1 | 3/2016 | Seurin et al. |
| 2016/0080077 A1 | 3/2016 | Joseph et al. |
| 2016/0119611 A1 | 4/2016 | Hall et al. |
| 2016/0161600 A1 | 6/2016 | Eldada et al. |
| 2016/0254638 A1 | 9/2016 | Chen et al. |
| 2016/0259038 A1 | 9/2016 | Retterath et al. |
| 2016/0266242 A1 | 9/2016 | Gilliland et al. |
| 2016/0274223 A1 | 9/2016 | Imai |
| 2016/0282468 A1 | 9/2016 | Gruver et al. |
| 2016/0291156 A1 | 10/2016 | Hjelmstad |
| 2016/0306358 A1 | 10/2016 | Kang et al. |
| 2016/0335778 A1 | 11/2016 | Smits |
| 2016/0348636 A1 | 12/2016 | Ghosh et al. |
| 2017/0003392 A1 | 1/2017 | Bartlett et al. |
| 2017/0026633 A1 | 1/2017 | Riza |
| 2017/0059838 A1 | 3/2017 | Tilleman |
| 2017/0115497 A1 | 4/2017 | Chen et al. |
| 2017/0131387 A1 | 5/2017 | Campbell et al. |
| 2017/0131388 A1 | 5/2017 | Campbell et al. |
| 2017/0139041 A1 | 5/2017 | Drader et al. |
| 2017/0153319 A1 | 6/2017 | Villeneuve et al. |
| 2017/0168162 A1 | 6/2017 | Jungwirth |
| 2017/0176579 A1 | 6/2017 | Niclass et al. |
| 2017/0181810 A1 | 6/2017 | Tennican |
| 2017/0219426 A1 | 8/2017 | Pacala et al. |
| 2017/0256915 A1 | 9/2017 | Ghosh et al. |
| 2017/0269209 A1 | 9/2017 | Hall et al. |
| 2017/0285169 A1 | 10/2017 | Holz |
| 2017/0289524 A1 | 10/2017 | Pacala et al. |
| 2017/0299722 A1 | 10/2017 | Ouyang et al. |
| 2017/0307736 A1 | 10/2017 | Donovan |
| 2017/0307758 A1 | 10/2017 | Pei et al. |
| 2017/0350982 A1 | 12/2017 | Lipson |
| 2017/0353004 A1 | 12/2017 | Chen et al. |
| 2017/0356740 A1 | 12/2017 | Ansari et al. |
| 2018/0045816 A1 | 2/2018 | Jarosinski et al. |
| 2018/0058923 A1 | 3/2018 | Lipson et al. |
| 2018/0059222 A1 | 3/2018 | Pacala et al. |
| 2018/0062345 A1 | 3/2018 | Bills et al. |
| 2018/0068458 A1 | 3/2018 | Wan et al. |
| 2018/0074198 A1 | 3/2018 | Von Novak et al. |
| 2018/0107221 A1 | 4/2018 | Droz et al. |
| 2018/0113200 A1 | 4/2018 | Steinberg et al. |
| 2018/0113208 A1 | 4/2018 | Bergeron et al. |
| 2018/0120441 A1 | 5/2018 | Elooz et al. |
| 2018/0128920 A1 | 5/2018 | Keilaf et al. |
| 2018/0136335 A1 | 5/2018 | Kare et al. |
| 2018/0152691 A1 | 5/2018 | Pacala et al. |
| 2018/0167602 A1 | 6/2018 | Pacala et al. |
| 2018/0180720 A1 | 6/2018 | Pei et al. |
| 2018/0180721 A1 | 6/2018 | Pei et al. |
| 2018/0180722 A1 | 6/2018 | Pei et al. |
| 2018/0203247 A1 | 7/2018 | Chen et al. |
| 2018/0209841 A1 | 7/2018 | Pacala et al. |
| 2018/0217236 A1 | 8/2018 | Pacala et al. |
| 2018/0259623 A1 | 9/2018 | Donovan |
| 2018/0259624 A1 | 9/2018 | Kiehn et al. |
| 2018/0259645 A1 | 9/2018 | Shu et al. |
| 2018/0269646 A1 | 9/2018 | Welford et al. |
| 2018/0275248 A1 | 9/2018 | Bailey et al. |
| 2018/0299552 A1 | 10/2018 | Shu et al. |
| 2018/0301872 A1 | 10/2018 | Burroughs et al. |
| 2018/0301874 A1 | 10/2018 | Burroughs et al. |
| 2018/0301875 A1 | 10/2018 | Burroughs et al. |
| 2018/0364334 A1 | 12/2018 | Xiang et al. |
| 2018/0364356 A1 | 12/2018 | Eichenholz et al. |
| 2019/0003429 A1 | 1/2019 | Miyashita |
| 2019/0004156 A1 | 1/2019 | Niclass et al. |
| 2019/0011561 A1 | 1/2019 | Pacala et al. |
| 2019/0011567 A1 | 1/2019 | Pacala et al. |
| 2019/0018108 A1* | 1/2019 | Gao ............... G01S 17/89 |
| 2019/0018115 A1 | 1/2019 | Schmitt et al. |
| 2019/0036308 A1 | 1/2019 | Carson et al. |
| 2019/0049662 A1 | 2/2019 | Thomsen et al. |
| 2019/0056497 A1 | 2/2019 | Pacala et al. |
| 2019/0094346 A1 | 3/2019 | Dumoulin et al. |
| 2019/0098233 A1 | 3/2019 | Gassend et al. |
| 2019/0137607 A1 | 5/2019 | Kostamovaara |
| 2019/0146071 A1 | 5/2019 | Donovan |
| 2019/0170855 A1 | 6/2019 | Keller et al. |
| 2019/0178974 A1 | 6/2019 | Droz |
| 2019/0179018 A1 | 6/2019 | Gunnam et al. |
| 2019/0293954 A1 | 9/2019 | Lin et al. |
| 2019/0302246 A1 | 10/2019 | Donovan et al. |
| 2020/0018835 A1 | 1/2020 | Pei et al. |
| 2020/0041614 A1 | 2/2020 | Donovan et al. |
| 2020/0081101 A1 | 3/2020 | Donovan |
| 2020/0124732 A1 | 4/2020 | Sutherland et al. |
| 2020/0200874 A1 | 6/2020 | Donovan |
| 2020/0209355 A1 | 7/2020 | Pacala et al. |
| 2020/0278426 A1 | 9/2020 | Dummer et al. |
| 2020/0326425 A1 | 10/2020 | Donovan et al. |
| 2020/0379088 A1 | 12/2020 | Donovan et al. |
| 2020/0386868 A1 | 12/2020 | Donovan et al. |
| 2020/0408908 A1 | 12/2020 | Donovan |
| 2021/0033708 A1 | 2/2021 | Fabiny |
| 2021/0041567 A1 | 2/2021 | Milgrome et al. |
| 2021/0157000 A1 | 5/2021 | Imaki |
| 2021/0181311 A1 | 6/2021 | Donovan |
| 2021/0231779 A1 | 7/2021 | Donovan |
| 2021/0231806 A1 | 7/2021 | Donovan et al. |
| 2021/0234342 A1 | 7/2021 | Donovan |
| 2021/0278540 A1 | 9/2021 | Maayan et al. |
| 2021/0321080 A1 | 10/2021 | Jeong et al. |
| 2022/0146680 A1 | 5/2022 | Donovan et al. |
| 2022/0291359 A1 | 9/2022 | Tziony et al. |
| 2022/0365219 A1 | 11/2022 | Maayan et al. |

FOREIGN PATENT DOCUMENTS

| | | |
|---|---|---|
| CN | 101080733 A | 11/2007 |
| CN | 101545582 A | 9/2009 |
| CN | 103633557 A | 3/2014 |
| CN | 104898125 A | 9/2015 |
| CN | 105705964 A | 6/2016 |
| CN | 106464366 A | 2/2017 |
| CN | 109073757 A | 12/2018 |
| CN | 107728156 B | 11/2019 |
| CN | 110402398 A | 11/2019 |
| CN | 110914702 A | 3/2020 |
| CN | 111356934 A | 6/2020 |
| CN | 111919137 A | 11/2020 |
| CN | 112543875 A | 3/2021 |
| CN | 113692540 A | 11/2021 |

(56) References Cited

FOREIGN PATENT DOCUMENTS

| | | |
|---|---|---|
| CN | 113906316 A | 1/2022 |
| CN | 113924506 A | 1/2022 |
| CN | 114096882 A | 2/2022 |
| CN | 114174869 A | 3/2022 |
| DE | 19717399 A1 | 6/1999 |
| DE | 10103861 A1 | 8/2001 |
| DE | 102007004609 A1 | 8/2007 |
| DE | 102015101722 A1 | 8/2015 |
| DE | 102014216390 A1 | 2/2016 |
| DE | 102019005059 A1 | 2/2020 |
| EP | 1160540 A1 | 12/2001 |
| EP | 1444696 B1 | 3/2005 |
| EP | 1569007 A2 | 8/2005 |
| EP | 2656099 A1 | 10/2013 |
| EP | 2656106 A1 | 10/2013 |
| EP | 2775316 A2 | 9/2014 |
| EP | 2656100 A1 | 10/2016 |
| EP | 3159711 A1 | 4/2017 |
| EP | 3168641 A1 | 5/2017 |
| EP | 3446153 A2 | 2/2019 |
| EP | 3497477 A1 | 6/2019 |
| EP | 3526625 A1 | 8/2019 |
| EP | 3596492 A1 | 1/2020 |
| EP | 3658949 A1 | 6/2020 |
| EP | 3710855 A2 | 9/2020 |
| EP | 3775979 A1 | 2/2021 |
| EP | 3830602 A1 | 6/2021 |
| EP | 3953727 A1 | 2/2022 |
| EP | 3977159 A1 | 4/2022 |
| EP | 3980808 A1 | 4/2022 |
| EP | 3990943 A1 | 5/2022 |
| EP | 4004587 A1 | 6/2022 |
| FR | 2816264 A1 | 5/2002 |
| JP | H05-243552 A | 9/1993 |
| JP | H7-253460 A | 10/1995 |
| JP | 8-280173 A | 10/1996 |
| JP | H10-126007 A | 5/1998 |
| JP | 2000-147604 A | 5/2000 |
| JP | 2002-214361 A | 7/2002 |
| JP | 2003-258359 A | 9/2003 |
| JP | 2003-536061 A | 12/2003 |
| JP | 2004-078255 A | 3/2004 |
| JP | 2004-094115 A | 3/2004 |
| JP | 2004-361315 A | 12/2004 |
| JP | 2005-331273 A | 12/2005 |
| JP | 2006-162386 A | 6/2006 |
| JP | 2007-214564 A | 8/2007 |
| JP | 2008-015434 A | 1/2008 |
| JP | 4108478 B2 | 6/2008 |
| JP | 2008-180719 A | 8/2008 |
| JP | 2009-103529 A | 5/2009 |
| JP | 2009-170870 A | 7/2009 |
| JP | 2009-204691 A | 9/2009 |
| JP | 2010-091855 A | 4/2010 |
| JP | 2010-256291 A | 11/2010 |
| JP | 2011-003748 A | 1/2011 |
| JP | 2012-504771 A | 2/2012 |
| JP | 5096008 B2 | 12/2012 |
| JP | 2013-050310 A | 3/2013 |
| JP | 2013-113669 A | 6/2013 |
| JP | 2014-059302 A | 4/2014 |
| JP | 2014-077658 A | 5/2014 |
| JP | 2015-040671 A | 3/2015 |
| JP | 2016-146417 A | 8/2016 |
| JP | 2016-176721 A | 10/2016 |
| JP | 2016-188808 A | 11/2016 |
| JP | 2016-540189 A | 12/2016 |
| JP | 2017-053833 A | 3/2017 |
| JP | 2017-134814 A | 8/2017 |
| JP | 2018-025632 A | 2/2018 |
| JP | 2019-060652 A | 4/2019 |
| JP | 2019-68528 A | 4/2019 |
| JP | 2019-509474 A | 4/2019 |
| JP | 2019-516101 A | 6/2019 |
| JP | 2020-510208 A | 4/2020 |
| JP | 2021-503085 A | 2/2021 |
| JP | 2021-507260 A | 2/2021 |
| JP | 6839861 B2 | 3/2021 |
| JP | 6865492 B2 | 4/2021 |
| JP | 2021-073462 A | 5/2021 |
| JP | 2021-073473 A | 5/2021 |
| JP | 2021-105613 A | 7/2021 |
| JP | 2021-519926 A | 8/2021 |
| JP | 2021-139918 A | 9/2021 |
| JP | 2021-532368 A | 11/2021 |
| JP | 2022-001885 A | 1/2022 |
| JP | 6995413 B2 | 1/2022 |
| JP | 2022-022361 A | 2/2022 |
| JP | 2022-036224 A | 3/2022 |
| JP | 7037830 B2 | 3/2022 |
| JP | 2022-526998 A | 5/2022 |
| JP | 2022-534500 A | 8/2022 |
| KR | 10-2000-005362 | 8/2000 |
| KR | 10-2000-0053620 A | 8/2000 |
| KR | 10-2009-001649 | 2/2009 |
| KR | 10-2012-005304 | 5/2012 |
| KR | 10-2012-0053045 A | 5/2012 |
| KR | 10-2012-006103 A | 6/2012 |
| KR | 10-2013-014055 | 12/2013 |
| KR | 10-2014-013872 A | 12/2014 |
| KR | 10-2014-0138724 A | 12/2014 |
| KR | 10-2015-004573 | 4/2015 |
| KR | 10-2016-010114 | 8/2016 |
| KR | 10-2018-004993 A | 5/2018 |
| KR | 10-2018-006496 A | 6/2018 |
| KR | 10-2018-012844 A | 12/2018 |
| KR | 10-2019-007672 A | 7/2019 |
| KR | 10-2019-011741 | 10/2019 |
| KR | 10-2019-012040 A | 10/2019 |
| KR | 10-2020-001135 A | 2/2020 |
| KR | 10-2020-007501 A | 6/2020 |
| KR | 10-2020-009663 | 8/2020 |
| KR | 10-2020-012843 A | 11/2020 |
| KR | 10-2021-002140 A | 2/2021 |
| KR | 10-2218679 B1 | 2/2021 |
| KR | 10-2021-002983 A | 3/2021 |
| KR | 10-2021-006520 A | 6/2021 |
| KR | 10-2021-013758 | 11/2021 |
| KR | 10-2021-013758 A | 11/2021 |
| KR | 10-2326493 B1 | 11/2021 |
| KR | 10-2326508 B1 | 11/2021 |
| KR | 10-2022-000360 A | 1/2022 |
| KR | 10-2022-001741 A | 2/2022 |
| KR | 10-2364531 B1 | 2/2022 |
| KR | 10-2022-002417 A | 3/2022 |
| KR | 10-2022-002592 | 3/2022 |
| KR | 10-2022-003869 A | 3/2022 |
| KR | 10-2398080 B1 | 5/2022 |
| WO | 1999/042856 A2 | 8/1999 |
| WO | 2002/065153 A1 | 8/2002 |
| WO | 2006/044758 A2 | 4/2006 |
| WO | 2006/083349 A2 | 8/2006 |
| WO | 2013/107709 A1 | 7/2013 |
| WO | 2014/014838 A2 | 1/2014 |
| WO | 2015/040671 A1 | 3/2015 |
| WO | 2015/059705 A1 | 4/2015 |
| WO | 2017/112416 A1 | 6/2017 |
| WO | 2017/132704 A1 | 8/2017 |
| WO | 2017/184336 A2 | 10/2017 |
| WO | 2018/028795 A1 | 2/2018 |
| WO | 2018/082762 A1 | 5/2018 |
| WO | 2018/166609 A1 | 9/2018 |
| WO | 2018/166610 A1 | 9/2018 |
| WO | 2018/166611 A1 | 9/2018 |
| WO | 2018/169758 A1 | 9/2018 |
| WO | 2018/180391 A1 | 10/2018 |
| WO | 2018/181250 A1 | 10/2018 |
| WO | 2018/191495 A1 | 10/2018 |
| WO | 2019/010320 A1 | 1/2019 |
| WO | 2019/022941 A1 | 1/2019 |
| WO | 2019/064062 A1 | 4/2019 |
| WO | 2019/115148 A1 | 6/2019 |
| WO | 2019/195054 A1 | 10/2019 |
| WO | 2019/221776 A2 | 11/2019 |

(56) References Cited

FOREIGN PATENT DOCUMENTS

| WO | 2020/028173 A1 | 2/2020 |
|---|---|---|
| WO | 2020/210176 A1 | 10/2020 |
| WO | 2020/242834 A1 | 12/2020 |
| WO | 2020/251891 A1 | 12/2020 |
| WO | 2020/263735 A1 | 12/2020 |
| WO | 2021/021872 A1 | 2/2021 |
| WO | 2021/150860 A1 | 7/2021 |
| WO | 2021/236201 A2 | 11/2021 |
| WO | 2022/103778 A1 | 5/2022 |

OTHER PUBLICATIONS

Restriction Requirement received for U.S. Appl. No. 16/523,459, mailed on Jun. 16, 2022, 05 pages.
Restriction Requirement received for U.S. Appl. No. 16/366,729, mailed on Jun. 3, 2022, 06 pages.
Partial Supplementary European Search Report received for European Patent Application No. 17786325.5, mailed on Nov. 7, 2019, 17 pages.
Plant, et al., "256-Channel Bidirectional Optical Interconnect Using VCSELs and Photodiodes on CMOS", Journal of Lightwave Technology, vol. 19, No. 8, Aug. 2001, pp. 1093-1103.
Knodl, et al., "Bipolar Cascade VCSEL with 130% Differential Quantum Efficiency", Annual Report 2000, Optoelectronics Department, pp. 11-14.
Morgan, et al., "Two-Dimensional Matrix Addressed Vertical Cavity Top-Surface Emitting Laser Array Display", IEEE Photonics Technology Letters, vol. 6, No. 8, Aug. 1994, pp. 913-917.
Orenstein, et al., "Matrix Addressable Vertical Cavity Surface Emitting Laser Array", Electronics Letters, vol. 27, No. 5, Feb. 28, 1991, pp. 437-438.
Geib, et al., "Fabrication and Performance of Two-Dimensional Matrix Addressable Arrays of Integrated Vertical-Cavity Lasers and Resonant Cavity Photodetectors", IEEE Journal of Selected Topics In Quantum Electronics, vol. 8, No. 4, Jul./Aug. 2002, pp. 943-947.
Moench et al., "VCSEL Based Sensors for Distance and Velocity", Vertical Cavity Surface-Emitting Lasers XX, Proc. Of SPIE, vol. 9766, 2016, pp. 97660A-1-97660A-11.
Office Action received for Korean Patent Application Serial No. 10-2021-7036648, mailed on Dec. 17, 2021, 8 pages (4 pages of English Translation and 4 pages of Official Copy).
Office Action received for Korean Patent Application Serial No. 10-2021-7006391, mailed on Oct. 22, 2021, 5 pages. (2 pages of English Translation and 3 pages of Official Copy).
Office Action received for Korean Patent Application No. 10-2021-7006391, mailed on May 14, 2021, 17 pages (9 pages of English Translation and 8 pages of Official Copy).
Office Action received for Korean Patent Application No. 10-2021-7004589, mailed on Mar. 10, 2021, 9 pages (5 pages of English Translation and 4 pages of Official Copy).
Office Action received for Korean Patent Application No. 10-2020-7029872, mailed on Jul. 19, 2021, 23 pages (13 pages of English Translation and 10 pages of Official Copy).
Ofice Action received for Korean Patent Application No. 10-2020-7016928, mailed on Jul. 16, 2021, 13 pages (7 pages of English Translation and 6 pages of Official Copy).
Office Action received for Korean Patent Application No. 10-2020-7005082, mailed on May 8, 2020, 19 pages (11 pages of English Translation and 8 pages of Official Copy).
Office Action received for Korean Patent Application No. 10-2019-7029980, mailed on Mar. 26, 2021, 6 pages (3 pages of English Translation and 3 pages of Official Copy).
Office Action received for Korean Patent Application No. 10-2018-7030512, mailed on Dec. 23, 2021, 7 pages. (3 pages of English Translation and 4 pages of Official Copy).
Office Action received for Korean Application Serial No. 10-2020-7029872, mailed on May 24, 2022, 05 pages (2 pages of English Translation and 3 pages of Official Copy).
Office Action received for Korean Application Serial No. 10-2020-7029872, mailed on Jan. 19, 2022, 32 pages (18 pages of English Translation and 14 pages of Official Copy).
Office Action received for Japanese Patent Application Serial No. 2021-168642, mailed on Aug. 25, 2022, 4 pages (2 pages of English Translation and 2 pages of Official Copy).
Office Action received for Japanese Patent Application Serial No. 2021-100687, mailed on Jul. 1, 2022, 09 pages. (6 pages of English Translation and 3 pages of Official Copy).
Office Action received for Japanese Patent Application Serial No. 2020-526502, mailed on Aug. 24, 2022, 10 pages (5 pages of English Translation and 5 pages of Official Copy).
Office Action received for Japanese Patent Application No. 2021-056628, mailed on Jun. 14, 2021, 6 pages (3 pages of English Translation and 3 pages of Official Copy).
Office Action received for Japanese Patent Application No. 2021-014376, mailed on Sep. 27, 2021, 18 pages (12 pages of English Translation and 6 paegs of Official Copy).
Office Action received for Japanese Patent Application No. 2020-504014, mailed on Sep. 2, 2020, 7 pages (3 pages of English Translation and 4 pages of Official Copy).
International Search Report and the Written Opinion received for PCT Patent Application No. PCT/US2020/033630, mailed on Sep. 9, 2020, 9 pages.
Office Action received for Japanese Patent Application No. 2019-549550, mailed on Mar. 22, 2021, 6 pages (3 pages of English Translation and 3 pages of Official Copy).
Office Action received for Japanese Patent Application No. 2019-549550, mailed on Aug. 27, 2021, 7 pages (5 pages of English Translation and 2 pages of Official Copy).
Office Action received for European Patent Application No. 17786325.5, mailed on Dec. 17, 2021, 5 pages.
Office Action received for Chinese Patent Application Serial No. 201880047615.6, mailed on Aug. 25, 2021, 12 pages (6 pages of English Translation and 6 pages of Official Copy).
Office Action received for Chinese Patent Application No. 201880047615.6, mailed on Jan. 18, 2021, 16 pages (8 pages of English Translation and 8 pages of Official Copy).
Office Action for Japanese Patent Application No. 2021-020502, Apr. 13, 2022, 10 pages (7 pages of English Translation and 3 pages of Official Copy).
Notice of Grant received for Korean Patent Application No. 10-2020-7005082, Nov. 24, 2020, 5 pages (3 pages of English Translation and 2 pages of Official Copy).
Notice of Allowance received for U.S. Appl. No. 17/227,300, mailed on Feb. 8, 2022, 11 pages.
Notice of Allowance received for U.S. Appl. No. 16/895,588, mailed on Aug. 3, 2022, 9 pages.
Notice of Allowance received for U.S. Appl. No. 16/841,930, mailed on Jun. 29, 2022, 10 pages.
Notice of Allowance received for U.S. Appl. No. 16/805,733, mailed on Aug. 22, 2022, 13 pages.
Notice of Allowance received for U.S. Appl. No. 16/686,163, mailed on Oct. 16, 2020, 09 pages.
Notice of Allowance received for U.S. Appl. No. 16/028,774, mailed on Aug. 21, 2019, 10 pages.
Notice of Allowance received for U.S. Appl. No. 15/915,840, mailed on Jan. 19, 2021, 6 pages.
Notice of Allowance received for U.S. Appl. No. 15/456,789, mailed on Apr. 29, 2020, 5 pages.
Notice of Allowance received for Korean Patent Application Serial No. 10-2021-7006391, mailed on Feb. 9, 2022, 03 pages (1 page of English Translation and 2 pages of Official Copy).
Notice of Allowance received for Korean Patent Application No. 10-2021-7004589, mailed on Aug. 6, 2021, 2 pages (1 page of English Translation and 1 page of Official Copy).
Notice of Allowance received for Korean Patent Application No. 10-2019-7029980, mailed on Aug. 6, 2021, 3 pages (1 page of English Translation and 2 pages of Official Copy).
Notice of Allowance received for Japanese Patent Application Serial No. 2021-056628, mailed on Nov. 2, 2021, 5 pages (2 pages of English Translation and 3 pages of Official Copy).

(56) References Cited

OTHER PUBLICATIONS

Notice of Allowance received for Japanese Patent Application No. 2020-504014, mailed on Feb. 15, 2021, 5 pages (2 pages of English Translation and 3 pages of Official Copy).
International Preliminary Report on Patentability received for PCT Application Serial No. PCT/US2020/033630, mailed on Dec. 9, 2021, 8 pages.
Notice of Allowance received for Japanese Patent Application No. 2018-555665, mailed on Dec. 2, 2020, 05 pages (2 pages of English Translation and 3 pages of Official Copy).
Office Action received for Korean Patent Application No. 10-2022-7028820, mailed on Jun. 26, 2023, 5 pages (2 pages of English Translation and 3 pages of Official Copy).
Office Action received for Japanese Patent Application Serial No. 2021-199077, mailed on Jun. 30, 2023, 11 pages (8 pages of English Translation and 3 pages of Official Copy).
Non-Final Office Action received for U.S. Appl. No. 16/168,054, mailed on Oct. 20, 2022, 16 pages.
Notice of Allowance received for U.S. Appl. No. 17/164,773, mailed on Nov. 2, 2022, 8 pages.
Notice of Allowance received for U.S. Appl. No. 16/805,733, mailed on Jan. 25, 2023, 5 pages.
Office Action received for Chinese Patent Application Serial No. 201780024892.0, mailed on Sep. 2, 2022, 28 pages (11 pages of English Translation and 17 pages of Official Copy).
Extended European Search Report received in European Application No. 20787345.6, mailed on Dec. 5, 2022, 8 pages.
Final Office Action received for U.S. Appl. No. 16/878,140, mailed on Feb. 1, 2023, 26 pages.
Notice of Allowance received for U.S. Appl. No. 17/164,773, mailed on Feb. 1, 2023, 8 pages.
Notice of Allowance received for U.S. Appl. No. 16/841,930, mailed on Jan. 30, 2023, 9 pages.
Restriction Requirement received for U.S. Appl. No. 16/941,896, mailed on Jan. 24, 2023, 06 pages.
Partial European Search Report received for European Patent Application No. 22178999.3, mailed on Oct. 10, 2022, 22 pages.
Decision to Grant received for Korean Patent Application Serial No. 10-2022-7021139, mailed on Dec. 14, 2022, 3 pages (1 page of English Translation and 2 pages of Official Copy).
Office Action received for Japanese Patent Application No. 2021-020502, mailed on Jan. 23, 2023, 6 pages (4 pages of English Translation and 2 pages of Official Copy).
Office Action received for Korean Patent Application No. 10-2021-7016081, mailed on Oct. 25, 2022, 4 pages (2 pages of English Translation and 2 pages of Official Copy).
Office Action received for Japanese Patent Application Serial No. 2021-199077, mailed on Dec. 23, 2022, 9 pages (6 pages of English Translation and 3 pages of Official Copy).
Office Action received for Korean Patent Application No. 10-2022-7028820, mailed on Dec. 15, 2022, 12 pages (6 pages of English Translation and 6 pages of Official Copy).
Extended European Search Report received for European Patent Application No. 20815113.4, mailed on Jan. 31, 2023, 14 pages.
Partial European Search Report received for European Patent Application No. 20822328.9, mailed on Feb. 6, 2023, 20 pages.
Office Action received for Korean Patent Application No. 10-2022-7004969, mailed on Jan. 9, 2023, 11 pages (6 pages of English Translation and 5 pages of Official Copy).
Office Action received for Japanese Patent Application Serial No. 2020-552870, mailed on Nov. 29, 2022, 11 pages (7 pages of English Translation and 4 pages of Official Copy).
Office Action received for Japanese Patent Application Serial No. 2022-002790, mailed on Dec. 26, 2022, 10 pages (7 pages of English Translation and 3 pages of Official Copy).
Decision to Grant received for Korean Patent Application Serial No. 10-2020-7029872, mailed on Nov. 28, 2022, 3 pages (1 page of English Translation and 2 pages of Official Copy).
Office Action received for Korean Patent Application No. 10-2022-7015754, mailed on Dec. 12, 2022, 21 pages (11 pages of English Translation and 10 pages of Official Copy).
Non-Final Office Action received for U.S. Appl. No. 17/227,295, mailed on Mar. 9, 2023, 10 pages.
Notice of Allowance received for U.S. Appl. No. 16/366,729, mailed on Mar. 8, 2023, 7 pages.
Extended European Search Report received for European Patent Application No. 22178999.3, mailed on Mar. 6, 2023, 25 pages.
International Search Report and the Written Opinion received for PCT Patent Application No. PCT/US2022/019054, mailed on Feb. 20, 2023, 13 pages.
Office Action received for Korean Application Serial No. 10-2021-7036300, mailed on Feb. 9, 2023, 14 pages (7 pages of English Translation and 7 pages of Official Copy).
Decision to Grant received for Korean Patent Application Serial No. 10-2021-7040665, mailed on Feb. 23, 2023, 3 pages (1 page of English Translation and 2 pages of Official Copy).
Office Action received for Chinese Patent Application Serial No. 201880017776.0, mailed on Feb. 16, 2023, 22 pages (10 pages of English Translation and 12 pages of Official Copy).
Office Action received for Chinese Patent Application Serial No. 201880074279.4, mailed on Mar. 1, 2023, 23 pages (9 pages of English Translation and 14 pages of Official Copy).
International Search Report and the Written Opinion received for PCT Patent Application No. PCT/US2022/028297, mailed on Mar. 13, 2023, 11 pages.
Notice of Allowance received for U.S. Appl. No. 17/164,773, mailed on Apr. 5, 2023, 8 pages.
Office Action received for Japanese Patent Application Serial No. 2021-100687, mailed on Mar. 14, 2023, 05 pages. (3 pages of English Translation and 2 pages of Official Copy).
Office Action received for Japanese Patent Application No. 2020-526502, mailed on Mar. 14, 2023, 8 pages (5 pages of English Translation and 3 pages of Official Copy).
Office Action received for Japanese Patent Application No. 2021-168642, mailed on Mar. 15, 2023, 5 pages (3 pages of English Translation and 2 pages of Official Copy).
Office Action received for Japanese Patent Application No. 2022-80688, mailed on Mar. 17, 2023, 11 pages (7 pages of English Translation and 4 pages of Official Copy).
Non-Final Office Action received for U.S. Appl. No. 17/155,626, mailed on Apr. 12, 2023, 24 pages.
Notice of Allowance received for U.S. Appl. No. 16/841,930, mailed on Apr. 17, 2023, 9 pages.
Final Office Action received for U.S. Appl. No. 16/523,459, mailed on Apr. 14, 2023, 13 pages.
Office Action received for Korean Patent Application No. 10-2022-7036873, mailed on Mar. 29, 2023, 22 pages (12 pages of English Translation and 10 pages of Official Copy).
Extended European Search Report received for European Patent Application No. 20822328.9, mailed on May 4, 2023, 34 pages.
Notice of Allowance received for U.S. Appl. No. 16/805,733, mailed on May 8, 2023, 5 pages.
Office Action received for Korean Patent Application No. 10-2023-7007292, mailed on Apr. 17, 2023, 19 pages (10 pages of English Translation and 9 pages of Official Copy).
Decision to Grant a Patent received for Korean Patent Application Serial No. 10-2023-7009114, mailed on May 16, 2023, 3 pages (1 page of English Translation and 2 pages of Official Copy).
Office Action for Japanese Patent Application No. 2021-572877, May 12, 2023, 12 pages (8 pages of English Translation and 4 pages of Official Copy).
Notice of Allowance received for Chinese Patent Application Serial No. 201780024892.0, mailed on May 30, 2023, 2 pages (Official Copy Only).
Office Action received for Japanese Patent Application No. 2021-559434, mailed on May 26, 2023, 17 pages (11 pages of English Translation and 6 pages of Official Copy).
Extended European Search Report received for European Patent Application No. 20831915.2, Jun. 2, 2023, 9 pages.

(56) References Cited

OTHER PUBLICATIONS

International Preliminary Report on Patentability received for PCT Application Serial No. PCT/US2021/058687, mailed on May 25, 2023 , 7 pages.
Notice of Allowance received for Chinese Patent Application Serial No. 201880047615.6, mailed on Mar. 23, 2022, 7 pages (2 pages of English Translation and 5 pages of Official Copy).
Non-Final Office Action received for U.S. Appl. No. 17/227,300, mailed on Jun. 30, 2021, 8 pages.
Non-Final Office Action received for U.S. Appl. No. 17/164,773, mailed on Apr. 21, 2022, 8 pages.
Non-Final Office Action received for U.S. Appl. No. 16/907,732, mailed on Jul. 13, 2022, 20 pages.
Non-Final Office Action received for U.S. Appl. No. 16/686,163, mailed on Apr. 16, 2020, 9 pages.
Non-Final Office Action received for U.S. Appl. No. 16/523,459, mailed on Sep. 13, 2022, 11 pages.
Non-Final Office Action received for U.S. Appl. No. 16/366,729, mailed on Aug. 26, 2022, 09 pages.
Non-Final Office Action received for U.S. Appl. No. 16/168,054, mailed on Jun. 1, 2021, 15 pages.
Non-Final Office Action received for U.S. Appl. No. 15/915,840, mailed on May 7, 2020, 11 pages.
Non-Final Office Action received for U.S. Appl. No. 15/456,789, mailed on Sep. 25, 2019, 10 pages.
International Search Report and Written Opinion received for PCT Patent Application No. PCT/US2020/026964, mailed on Jul. 28, 2020, 8 pages.
International Search Report and Written Opinion received for PCT Patent Application No. PCT/US2018/057026, mailed on Dec. 16, 2019, 9 pages.
International Search Report and Written Opinion received for PCT Patent Application No. PCT/US2018/041021, mailed on Nov. 5, 2018, 13 Pages.
International Search Report and Written Opinion received for PCT Patent Application No. PCT/US2018/021553, mailed on Jun. 20, 2018, 13 pages.
International Search Report and Written Opinion received for PCT Patent Application No. PCT/US2017/026109, mailed on Jun. 19, 2017, 15 pages.
International Search Report and Written Opinion received for PCT Application Serial No. PCT/US2021/058687, mailed on Mar. 3, 2022 , 11 pages.
International Search Report and Written Opinion received for PCT Application Serial No. PCT/US2021/020749, mailed on Jan. 3, 2022, 11 pages.
International Search Report and the Written Opinion received for PCT Patent Application No. PCT/US2021/014564, mailed on May 17, 2021, 8 pages.
International Search Report and the Written Opinion received for PCT Patent Application No. PCT/US2020/043979, mailed on Nov. 10, 2020, 7 pages.
International Search Report and the Written Opinion received for PCT Patent Application No. PCT/US2020/038927, mailed on Oct. 7, 2020, 12 pages.
International Search Report and the Written Opinion received for PCT Patent Application No. PCT/US2020/036634, mailed on Sep. 21, 2020, 7 pages.
International Search Report and the Written Opinion received for PCT Patent Application No. PCT/US2019/043674, mailed on Nov. 15, 2019, 14 pages.
International Search Report and the Written Opinion received for PCT Patent Application No. PCT/US2019/024343, Jul. 12, 2019, 15 Pages.
International Preliminary Report on Patentability received for PCT Patent Application No. PCT/US2020/026964, mailed on Oct. 21, 2021, 7 pages.
International Preliminary Report on Patentability received for PCT Patent Application No. PCT/US2018/041021, mailed on Feb. 6, 2020, 10 pages.
International Preliminary Report on Patentability received for PCT Patent Application No. PCT/US2017/026109, mailed on Nov. 1, 2018, 13 Pages.
International Preliminary Report on Patentability received for PCT Patent Application No. PCT/US2018/057026, mailed on May 28, 2020, 7 pages.
International Preliminary Report on Patentability received for PCT Application Serial No. PCT/US2021/020749, mailed on Sep. 15, 2022, 8 pages.
International Preliminary Report on Patentability received for PCT Application Serial No. PCT/US2021/014564, mailed on Aug. 4, 2022, 06 pages.
International Preliminary Report on Patentability received for PCT Application Serial No. PCT/US2020/038927, mailed on Jan. 6, 2022, 9 pages.
International Preliminary Report on Patentability received for PCT Application Serial No. PCT/US2020/036634, mailed on Dec. 23, 2021, 6 pages.
International Preliminary Report on Patentability received for PCT Application Serial No. PCT/US2019/043674, mailed on Feb. 18, 2021, 10 pages.
International Preliminary Report on Patentability received for PCT Application Application No. PCT/US2020/043979, mailed on Feb. 10, 2022, 06 pages.
International Preliminary Report on Patentability received for International Patent Application No. PCT/US2018/021553, mailed on Sep. 26, 2019, 9 Pages.
International Preliminary Report on Patentability for International Patent Application No. PCT/US2019/024343, mailed on Oct. 15, 2020, 9 pages.
Final Office Action received for U.S. Appl. No. 16/168,054, mailed on Jan. 26, 2022, 16 pages.
Extended European Search Report received for European Patent Application Serial No. 19843301.3, mailed on Feb. 18, 2022, 10 pages.
Extended European Search Report received for European Patent Application Serial No. 19781037.7, mailed on Oct. 25, 2021, 9 pages.
Extended European Search Report received for European Patent Application No. 18918938.4, mailed on Jul. 6, 2021, 9 pages.
Extended European Search Report received for European Patent Application No. 18839499.3, mailed on Mar. 4, 2021, 10 pages.
Extended European Search Report received for European Patent Application No. 18767885.9, Nov. 18, 2020, 10 pages.
Extended European Search Report received for European Patent Application No. 17786325.5, mailed on Mar. 11, 2020, 22 pages.
Non-Final Office Action received for U.S. Appl. No. 16/878,140, mailed on Jun. 22, 2022, 24 pages.
Decision to Grant a Patent received for Korean Patent Application Serial No. 10-2021-7036648, mailed on May 19, 2022, 3 pages (1 page of English Translation and 2 pages of Official Copy).
Decision to Grant a Patent received for Korean Patent Application Serial No. 10-2020-7016928, mailed on Nov. 16, 2021, 3 pages (1 page of English Translation and 2 pages of Official Copy).
Decision to Grant a Patent received for Korean Patent Application Serial No. 10-2018-7030512, mailed on Mar. 18, 2022, 3 pages (1 page of English Translation and 2 pages of Official Copy).
Decision to Grant a Patent received for Japanese Patent Application Serial No. 2021-014376, mailed on Mar. 22, 2022, 05 pages (2 pages of English Translation and 3 pages of Official Copy).
Decision to Grant a Patent received for Japanese Patent Application Serial No. 2019-549550, mailed on Feb. 25, 2022, 5 pages (2 pages of English Translation and 3 pages of Official Copy).
Notice of Allowance received for U.S. Appl. No. 16/805,733, mailed on Nov. 10, 2022, 5 pages.
Notice of Allowance received for U.S. Appl. No. 16/841,930, mailed on Oct. 3, 2022, 8 pages.
Notice of Allowance received for Japanese Patent Application Serial No. 2021-199077, mailed on Jan. 31, 2024, 3 pages of Official Copy.
Office Action received for Japanese Patent Application Serial No. 2023-080735, mailed on Feb. 2, 2024, 3 pages of Official Copy.

(56) References Cited

OTHER PUBLICATIONS

Office Action received for European Patent Application No. 18839499.3, mailed on May 13, 2024, 6 pages.

* cited by examiner

VCSEL ARRAY LIDAR TRANSMITTER WITH SMALL ANGULAR DIVERGENCE

The section headings used herein are for organizational purposes only and should not to be construed as limiting the subject matter described in the present application in any way.

RELATED APPLICATION SECTION

The present application is a continuation of U.S. patent application Ser. No. 17/164,773, filed on Feb. 1, 2021, entitled "VCSEL Array LIDAR Transmitter with Small Angular Divergence", which is a continuation of U.S. patent application Ser. No. 16/686,163, filed on Nov. 17, 2019, entitled "VCSEL Array LIDAR Transmitter with Small Angular Divergence", now granted as U.S. Pat. No. 10,928,486 on Feb. 23, 2021, which is a continuation of U.S. patent application Ser. No. 16/028,774, filed Jul. 6, 2018, entitled "VCSEL Array LIDAR Transmitter with Small Angular Divergence", now granted as U.S. Pat. No. 10,514,444 on Dec. 24, 2019, which is a non-provisional of U.S. Provisional Patent Application Ser. No. 62/538,149, filed Jul. 28, 2017, entitled "VCSEL Array LIDAR Transmitter with Small Angular Divergence." The entire content of U.S. patent application Ser. Nos. 17/164,773, 16/686,163, and 16/028,774, and U.S. Provisional Patent Application Ser. No. 62/538,149 are incorporated herein by reference.

INTRODUCTION

Autonomous, self-driving, and semi-autonomous automobiles use a combination of different sensors and technologies such as radar, image-recognition cameras, and sonar for detection and location of surrounding objects. These sensors enable a host of improvements in driver safety including collision warning, automatic-emergency braking, lane-departure warning, lane-keeping assistance, adaptive cruise control, and piloted driving. Among these sensor technologies, light detection and ranging (LIDAR) systems take a critical role, enabling real-time, high resolution 3D mapping of the surrounding environment.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teaching can be performed in any order and/or simultaneously as long as the teaching remains operable. Furthermore, it should be understood that the apparatus and methods of the present teaching can include any number or all of the described embodiments as long as the teaching remains operable.

The present teaching relates to Light Detection and Ranging Systems (LIDAR) that measure distances to various objects or targets that reflect and/or scatter light. It is desirable that LIDAR systems have a small footprint, high measurement resolution, and high detection sensitivity. VCSEL-array-based transmitters offer the promise of providing these benefits. Improvements are needed in the optical design of these VCSEL-array-based LIDAR transmitters in order to increase performance and to reduce size, weight, power, cost and complexity of LIDAR systems. As one example, LIDAR transmitter designs are needed that produce a small angular divergence in a compact package.

Figure 1:
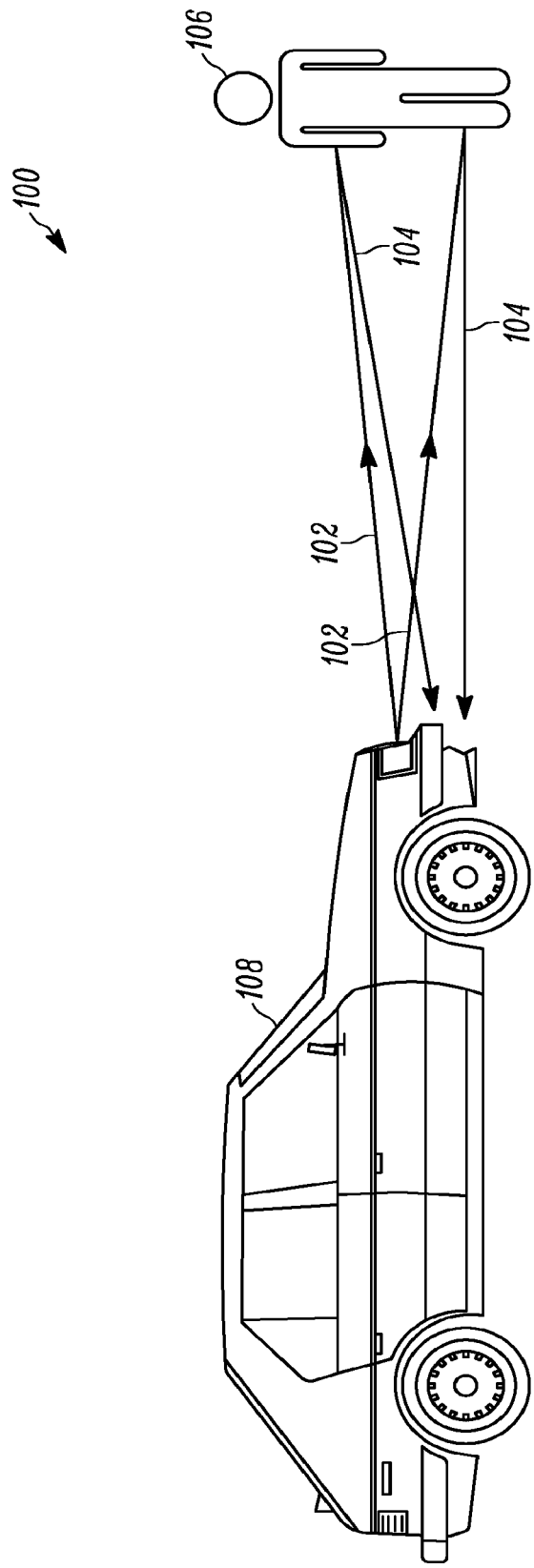
FIG. 1 illustrates the operation of a LIDAR system according to the present teaching.

FIG. 1 illustrates the operation of a LIDAR system 100 according to the present teaching that is implemented in a vehicle. The LIDAR system 100 includes a laser projector, also referred to as an illuminator, that projects light beams 102 generated by a light source toward a target scene and a receiver that receives the light 104 that reflects off an object, shown as a person 106, in that target scene. LIDAR systems typically also include a controller that computes the distance information about the object 106 from the reflected light, and an element that can scan or provide a particular pattern of the light that may be a static pattern across a desired range and field-of-view (FOV). The receiver and controller are used to convert the received signal light into measurements that represent a pointwise 3D map of the surrounding environment that falls within the LIDAR system range and FOV. In various embodiments, the controller can be a simple electrical circuit or can be a more complicated processor, depending on the particular application.

The laser source and optical beam projection means that form the illuminator and the receiver may be located on the front side of a vehicle 108. A person 106, and/or another object, such as a car or light pole, will provide light reflected from the source back to the receiver, and a range, or distance, to that object is determined. As is known in the art, a LIDAR receiver calculates range information based on time-of-flight measurements of light pulses emitted from the light source. In addition, known information about the optical beam profile that illuminates the scene in a target plane associated with a particular range and based on the particular design of the source and projector system is used to determine location information about the reflecting surface, thereby generating a complete x,y,z, or three-dimensional picture of the scene. In other words, the pointwise 3D map of the surrounding environment represents a collection of measurement data that indicates position information from all the surfaces that reflect the illumination from the source to the receiver within the field-of-view of the LIDAR system. In this way, a 3D representation of objects in the field-of-view of the LIDAR system is obtained. The pointwise 3D data map may also be referred to as a measurement point cloud.

One feature of the present teaching is that the illuminator may include lasers that emit optical beams with individual, distinct wavelengths. Typically, LIDAR systems do not utilize different laser wavelengths to enable improvements in the angular resolution of the LIDAR system. In particular, one feature of LIDAR systems of some embodiments of the present teaching is that they use multiple laser wavelengths to enable finer angular resolution and performance in a low-cost, compact optical design. Furthermore, multi-wavelength LIDAR systems of the present teaching can provide a simple path to improved security and parallelization. See, for example, U.S. patent application Ser. No. 15/456,789, entitled "Multi-Wavelength LIDAR System" filed on Mar. 3, 2017 and U.S. Patent Application Ser. No. 62/396,295, entitled "WDM Lidar System" filed on Sep. 19, 2016. U.S. patent application Ser. No. 15/456,789 and 62/396,295 are both assigned to the present assignee and are herein incorporated by reference.

Figure 2:
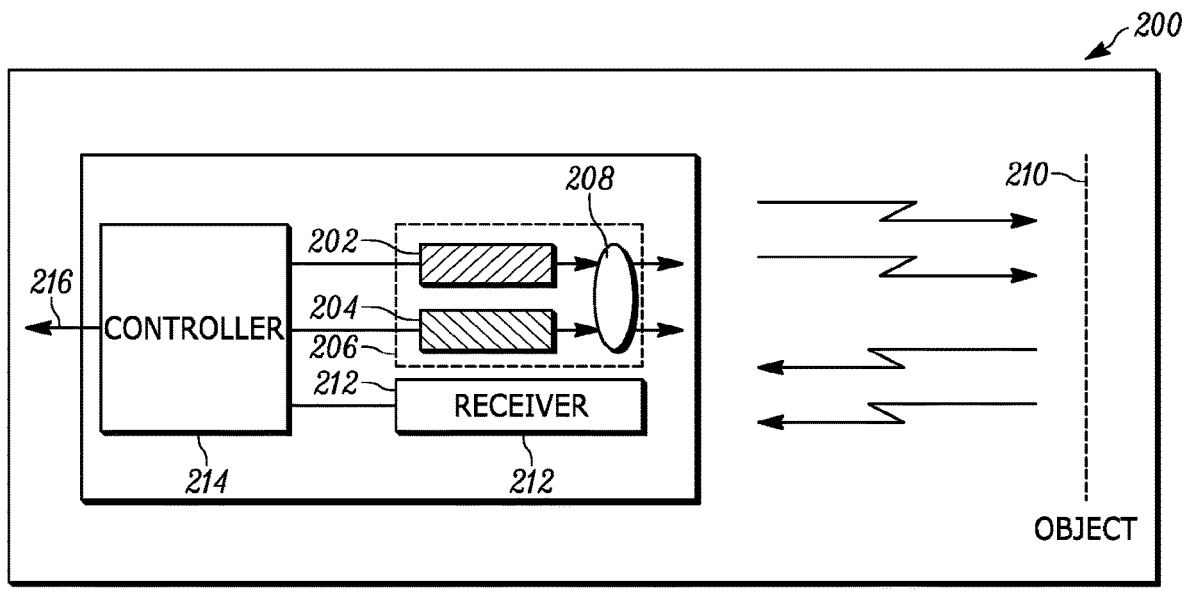
FIG. 2 illustrates an embodiment of a LIDAR system using two lasers according to the present teaching.

FIG. 2 illustrates an embodiment of a multi-wavelength LIDAR system 200 using two lasers according to the present teaching. The first laser 202 operates at a first wavelength, and the second laser 204 operates at a second wavelength. The lasers may include integrated or separate collimation optics that form part of an optical projection element that is used to form a beam profile at various target planes across the FOV and range of the LIDAR system. The illuminator 206 can also include an optical device 208 that further shapes and projects the optical beams to form particular beam profiles at target plane 210. In various embodiments, different types of optical devices can be used to form the optical projection element including, for example, one or more of lenses, diffractive optics, prisms, thin-film wavelength sensitive devices, and partially reflecting mirrors. Single lens or multi-lens optical elements may be used.

A receiver 212 receives light reflected off the surface of objects at various target planes 210 in the FOV and range of the LIDAR system. If different wavelengths are used, the receiver 212 may be able to distinguish light from the two wavelengths emitted by the sources 202, 204. In this case, reflected illumination from each wavelength is processed separately. A controller 214 is used to process the received light. The controller 214 provides LIDAR data at an output 216. The complexity of the controller 214 depends on the particular configuration of the LIDAR system. The controller 214 may be used to control the laser sources 202, 204. In various embodiments, the controller 214 may comprise various electrical circuits, integrated circuits, microprocessors, or computers. It is relatively straightforward to add N lasers with the same or different wavelengths to the LIDAR system shown in FIG. 2. In some embodiments, there are additional optical elements that collimate the light and provide the desired FOV.

A projection element as described herein is an element that collimates or otherwise shapes and/or projects a laser beam or multiple laser beams in a particular direction. A projection element can comprise one or more optical devices positioned in the path of the optical beams. These devices and their positions, together with the initial shape and paths of the beam or beams emitted from the laser source, produce the desired beam profile, which is a combination of beam shape and/or beam position at a particular point in space. Upon receipt of light reflected off objects at a receiver of the LIDAR system, the system generates a measurement point cloud, or pointwise data map, that is based on the pattern of light projected by the illuminator, and its performance parameters including angular resolution and field-of-view.

One feature of the present teaching is the ability to use different wavelengths to produce different LIDAR FOV, range, and/or resolution in a compact system. The light beams at the two or more wavelengths may be able to share at least some of the same optical devices that form the projection element, and yet still realize different beam profiles that result in a measurement point cloud that represents different range and/or FOV and/or resolution at each wavelength. For example, one problem with prior art LIDAR systems that use a signal wavelength is that the launch power required to reach 100-meter range is so high that for close proximity reflections (e.g. a few meters) the receiver saturates. Consequently, these prior art LIDAR systems are blind to near objects. This problem can be solved with a two-wavelength system, where the first wavelength is used for a 100-meter range, but the second wavelength has a low power only meant for near-proximity measurements. Multi-wavelength measurements can be performed simultaneous using a controller with parallel computing capability. The extension of this configuration to more than two wavelengths is relatively straightforward.

Another feature of the present teaching is that lasers with additional wavelengths can be added to perform functions other than LIDAR ranging. For example, additional lasers can be added to provide measurements of the orientation of optical devices within the LIDAR system. The light from these sources at additional wavelength may serve a sole purpose to provide angular measurement of the elements that project the optical beams and/or replicate or scan the optical beams. In some embodiments, MEMS devices are used to project beams, and it can be important to have direct feedback of the mirror position. Another laser combined with an appropriate receiver measurement system could provide direct angle measurement of mirror position. A natural extension of the above embodiments would be to use a plurality of lasers of the same wavelength in each case, that is, either a 1D or 2D array of lasers of each wavelength instead of a single laser of each wavelength.

In some systems, a single large lens is used to both collimate as well as set the projection angle of each VCSEL device. It should be noted that instead of a single lens, one or more lenses could be used as part of the shared lens configuration. One aspect of using a shared optic for both collimation and projection angle is that there is a direct mapping between the lateral position of the VCSEL device relative to the central axis of the lens and the pointing angle of the projected laser beam. The lateral distance between two VCSEL lasers of the same, or similar, wavelength will correspond to the difference in projection angles created by the shared lens system.

Furthermore, since the VCSEL device is not an ideal point source, but instead has a finite lateral size, there will be an additional divergence that cannot be reduced by the optics without also shrinking the FOV of the overall optic system. Also, the shared-optic approach using lasers with the same or similar wavelength may lead to beam overlap or gaps in the 3D measurement span depending on the finite size of the VCSEL, the divergence of the collimated beams, the number of VCSEL devices, and the FOV, among other parameters.

One feature of LIDAR systems of present teaching is the use of VCSEL chips with clusters of emitting apertures to take advantage of the higher optical power and large diameter cluster provided by these devices. As described herein, a VCSEL device is not an ideal point source, but rather has a finite lateral dimension. Furthermore, high-power top-emitting VCSEL lasers used for LIDAR illumination typically use multiple light emitting sub-apertures to reach the required high-power output. These multiple sub-apertures form a cluster or group, and ideally are located as close as physically possible, while still maintaining the required electro-optic efficiency.

In some embodiments, the VCSEL array is a two-dimensional array. In some embodiments, the VCSEL array is monolithic and the lasers all share a common substrate. A variety of common substrate types can be used. For example, the common substrate may be a semiconductor material. The common substrate may also include a ceramic material.

In some embodiments, the VCSELs are top-emitting VCSELS. In other embodiments, the VCSELs are bottom-emitting VCSELS. The individual VCSELs may have either a single large emission aperture, or the individual VCSELs may be formed from two or more sub-apertures within a larger effective emission diameter. A group of sub-apertures forming a larger effective emission region is sometimes referred to as a cluster.

Figure 3:
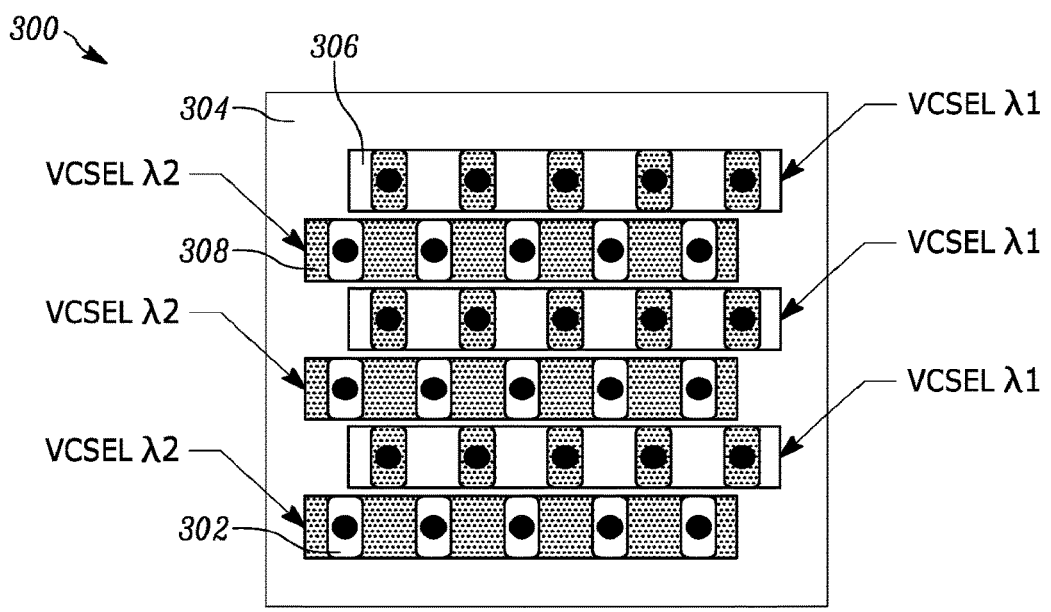
FIG. 3 illustrates an embodiment of a multi-emitter laser source for a LIDAR transmitter according to the present teaching.

FIG. 3 illustrates a multi-element emitter laser source 300 with two different VCSEL wavelengths interleaved uniformly in the vertical direction. The embodiment shown in FIG. 3 illustrates a single common substrate 304, but it will be clear to those skilled in the art that multiple substrates could also be used. There are six VCSEL bars 306, 308. The cluster VCSEL devices 302 of the bars 306 emit at one common wavelength. These are the bars 306 labeled "VCSEL λ1" in the figure. The cluster VCSEL devices 302 of the dark bars 308 emit at a different wavelength. The bars 308 are labeled "VCSEL λ2" in the figure. A total of thirty cluster VCSEL devices 302 are shown.

Figure 4:
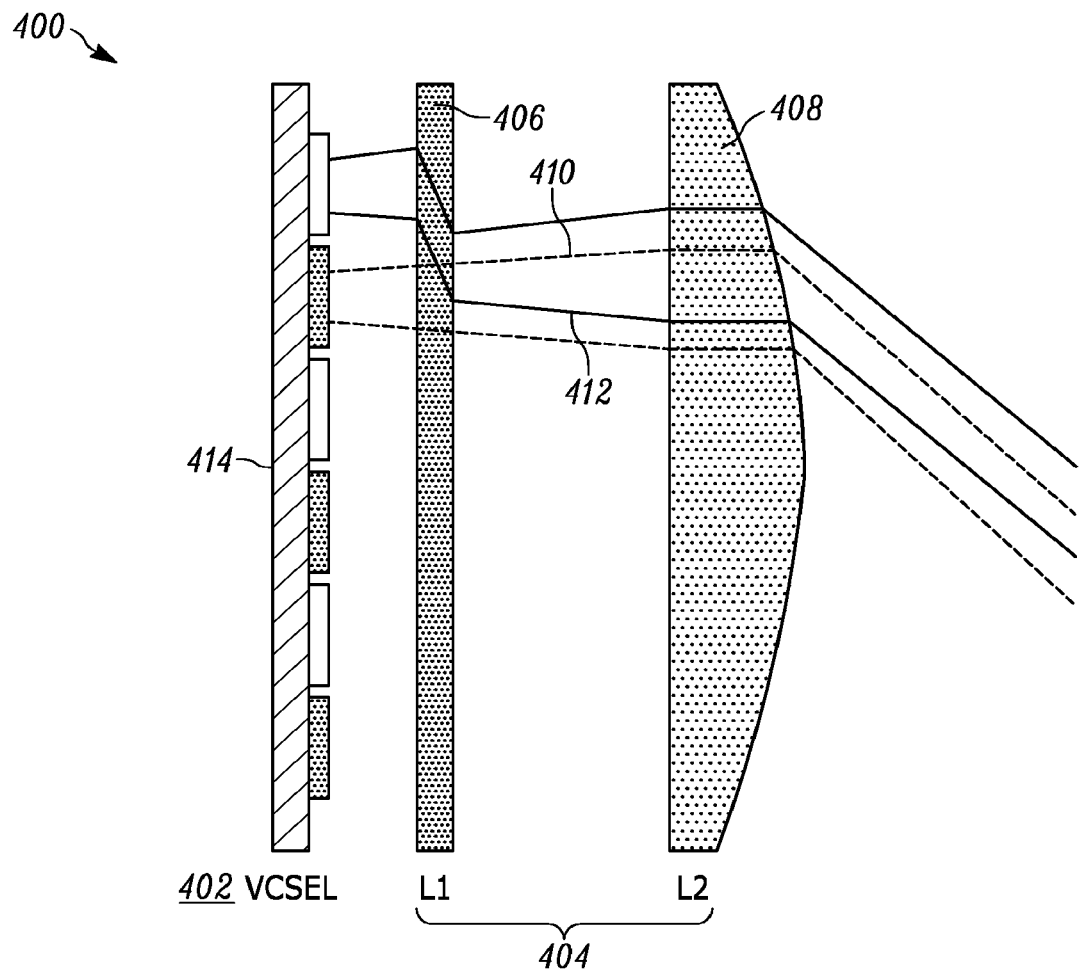
FIG. 4 illustrates a diagram of the cross-section of an embodiment of an illuminator for a LIDAR transmitter of the present teaching.

The illuminator used in connection with the multi-element emitter laser source 300 of FIG. 3 can use a shared lens system for both collimation and projection of the beams over the desired FOV. FIG. 4 illustrates a diagram of a cross-section of an embodiment of an illuminator 400 for a multi-wavelength LIDAR system of the present teaching that uses a multi-wavelength laser source shown in FIG. 3. The illuminator 400 includes the multi-emitter laser source 402, and a projection element 404 comprising a wavelength multiplexer 406 and a first lens 408. The projection element 404 is used to project the laser beams 410, 412 emitted from the laser source 402. The emitters for the multi-emitter laser source 402 are located on a VCSEL substrate 414.

The projection element 404 in FIG. 4 comprises two optical devices 406, 408. The first optical device is a wavelength multiplexer 406 that is a wavelength sensitive optic that acts to combine the laser beam 410 at one of the two wavelengths and from one optical path with the laser beam 412 at the other of the two wavelengths that is on another optical path onto a common optical path. In some embodiments, wavelength multiplexers comprise a diffractive optic that is configured to substantially shift the optical path of one wavelength while letting the second wavelength pass through undisturbed. Diffractive optic elements are well known in the art and can be used to provide precise beam steering and beam shaping of lasers. In some embodiments, a wavelength-sensitive diffractive optical element is used. In other embodiments, an array of refractive optics, such as prisms, is used. The second device is a lens 408 that is used to further project and shape the laser beams 410, 412 to form a desired pattern of beam shapes and beam positions at the target plane of the LIDAR system.

FIG. 4 illustrates how the light from two VCSEL bars of different wavelength travels through the optical system. For clarity, only the laser beams 410, 412 from two VCSEL emitters are shown ray traced. FIG. 4 illustrates only a single lens 408, however, it will be clear to those with skill in the art how to implement a two-lens, or multi-lens system as described, for example, in connection with FIG. 12 below with the multi-wavelength system illustrated in FIG. 4.

In operation, light from the beam profiles formed at a target plane by the illuminator is reflected from the surface of objects in that target plane. A target plane in a LIDAR system is a virtual reference point that operates over a complete range and field-of-view. There are many different target planes at various distances from the LIDAR module such that the system can generate three-dimensional representation of the objects in the field-of-view and range being probed by the LIDAR system. A portion of the light reflected off the surfaces of objects illuminated by the optical beam profiles in the target plane is directed to receivers. The receivers detect the light and then convert the received optical signal to an electrical signal. A controller electrically connected to the light sources and to the receiver converts the received signal into a measurement point cloud. The angular resolution of points in the measurement point cloud depends of the relative position of the beam profiles at a target plane, as described further below. It will be clear to those skilled in the art that many other variations of the embodiment of the illuminator 400 illustrated in FIG. 4 are within the scope of the present teaching. For example, VCSEL lasers may be located in a common surface, either planar or curved. It will also be clear to those skilled in the art that some deviation of the VCSEL away from a central surface, curved or flat, can be tolerated.

Figure 5A:
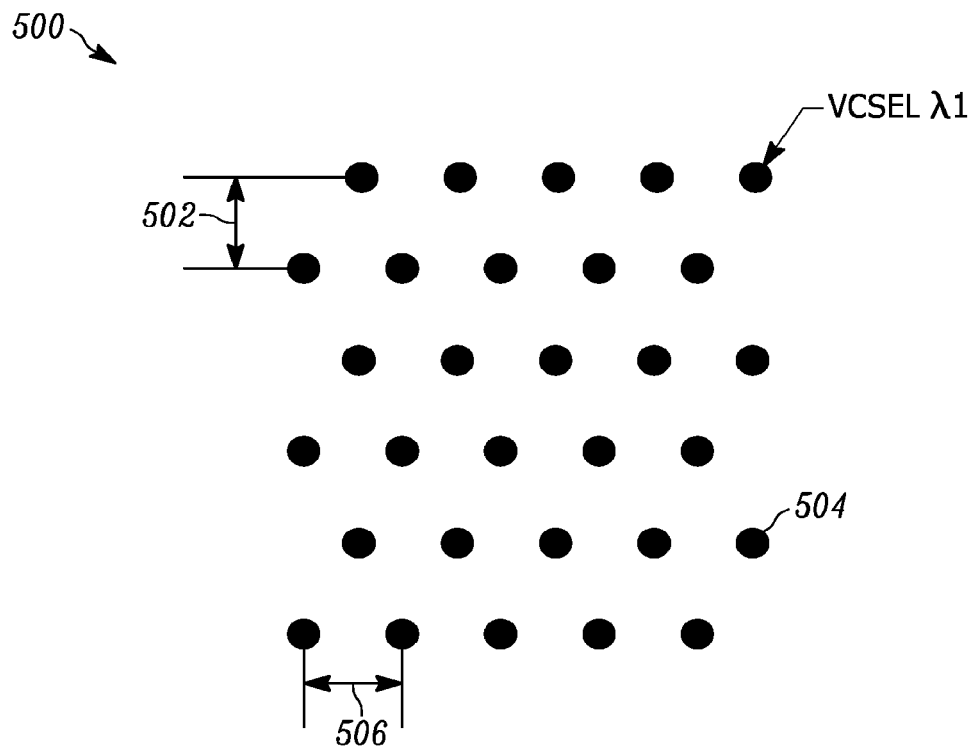
FIG. 5A illustrates a measurement point cloud for an embodiment of a single-wavelength 2D multi-emitter LIDAR transmitter of the present teaching.

FIG. 5A illustrates a measurement point cloud 500 for an embodiment of a single-wavelength 2D laser source illumination according to the present teaching. The distance between the vertical spacing 502 of the measurement points 504 determines the vertical angular resolution. The horizontal spacing 506 of the points on the point cloud determines the horizontal angular resolution of the point cloud.

Figure 5B:
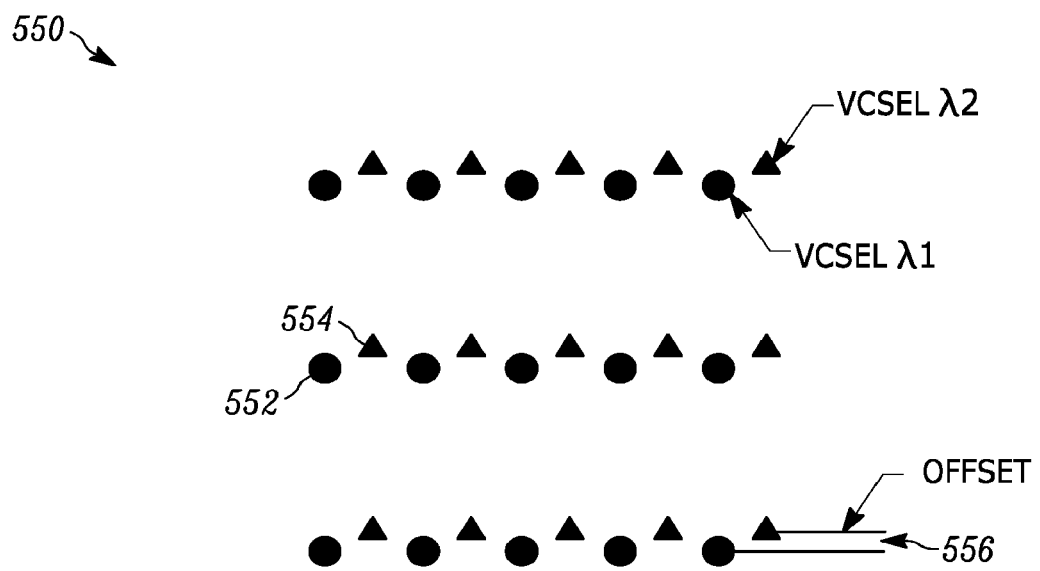
FIG. 5B illustrates a measurement point cloud for an embodiment of a two-wavelength 2D multi-emitter LIDAR transmitter according to the present teaching.

FIG. 5B illustrates a measurement point cloud 550 for an embodiment of a two-wavelength 2D laser source illumination of the present teaching. A measurement point corresponding to a VCSEL with λ1 is shown as a circle 552, a measurement point with a VCSEL with λ2 is shown as a triangle 554. A composite point cloud includes a point cloud derived from reflections received at λ1 and a point cloud derived from reflections received at λ2.

For example, the measurement point cloud 550 illustrated in FIG. 5B can be realized using the multi-emitter laser source with the pattern of VCSEL emitters of different wavelengths illustrated in FIG. 3 together with the illuminator configuration of FIG. 4. A portion of the light from optical beams generated by the illuminator at the target plane is reflected by the surface of an object and incident on one or more optical receivers that are capable of detecting light at particular wavelengths. The resulting measurement point cloud 550 includes points representing light from the different beam profiles that are at different wavelengths.

Referring to FIGS. 3-5, different wavelength VCSEL bars 306, 308 occupy different rows of the laser source in the vertical direction, and individual VCSEL devices 302 in different rows have their centers offset in the horizontal direction. The optical beams from emitters in different wavelength bars are projected by the projection element 404 so that the optical beam positions are slightly offset at the target plane in the vertical direction. This causes the offset 556 in the measurement point cloud. The offset in the center position of the VCSELs in adjacent bars, together with the design of the projection element causes the measurement points representing each wavelength to be interleaved horizontally along the offset vertical lines. The angular resolution of the measurements in a given dimension is directly related to the offset of the points in that dimension, which is related directly to the positions of the optical beams in that dimension at the target plane.

Referring to both FIG. 5A-B, a performance tradeoff associated with using a two-wavelength solution is clear. In the embodiment shown in FIG. 5, the optical beams at one wavelength travel substantially uninterrupted, but the optical beams at the second wavelength are intentionally shifted in position to substantially overlap in one direction with the optical beams at the first wavelength. The offset 556 in position of the optical beams at each wavelength indicated in the drawing in FIG. 5B can be adjusted based on the design of the wavelength multiplexer. For example, in some embodiments, the wavelength multiplexer 406 in FIG. 4 is specifically designed to provide a particular offset 556 in position of the optical beams at each wavelength. In various embodiments, various devices in the projection element are used to position the beams of the lasers at the two wavelengths. These same devices, or other devices, may alter the beam shapes as well their positions at the target plane.

As compared to the single wavelength embodiment of FIG. 5A, the embodiment described in connection with FIG. 5B doubles the angular resolution in a preferred direction, which in this case is the horizontal direction, at the expense of halving the angular resolution in the perpendicular direction. This is accomplished while keeping the overall physical size of the system relatively constant. In some applications, finer resolution in one direction may be preferred or necessary, for instance if instead of a pedestrian, the system needs to distinguish a pole or tree with a cross-section of only 100 mm. At 30 m, we would need an angular resolution that is less than 0.15 degrees. For automotive LIDAR systems, it could be highly desired to have a very small angular resolution in the horizontal direction, at the expense of wider angular resolution in the vertical since common objects that need to be recognized, such as humans, poles, and trees are tall but narrow. In some embodiments, the angular resolution of the measurement point cloud is less than 0.4 degree at a predetermined distance from the target plane to the optical projection element.

One feature of the present teaching is that single element emitters and multi-element emitters light sources operating at different wavelengths do not need to be located on the same surface. Another feature of the present teaching is that the surfaces may be oriented along different spatial planes in three-dimensional space. For example, the planes may be on two orthogonal planes. In some embodiments, we use a plurality of surface emitting lasers made up of at least two groups of lasers with different wavelengths. We also make use of three-dimensional space and each group of lasers are oriented in two or more surfaces, planar or curved, that are not necessarily orthogonal. In these embodiments, the packaging and optical alignment complexity increases relative to embodiments in which the lasers are co-located on a common surface, but we are able to increase the resolution angle across the full field-of-view in both orthogonal directions, without any compromise. This provides both higher precision as well as full access to all the capabilities associated with more than one wavelength. That is, it is possible to realize simultaneous operation, redundancy, security and other features of multi-wavelength operation.

One feature of the present teaching is that the small angular divergence LIDAR transmitter of the present teaching provides a compact LIDAR module especially suited to LIDARs that operate with a range requirement of about 100 meters. Another feature of the small angular divergence LIDAR transmitter of the present teaching is that it may utilize a solid-state optical emitter. Consequently, the LIDAR transmitter of the present teaching can be built utilizing no moving parts. In addition, multiple lasers, which may emit at the same or different wavelengths, can be used to establish a one-to-one mapping between each laser and a 3D measurement point cloud.

Figure 6:
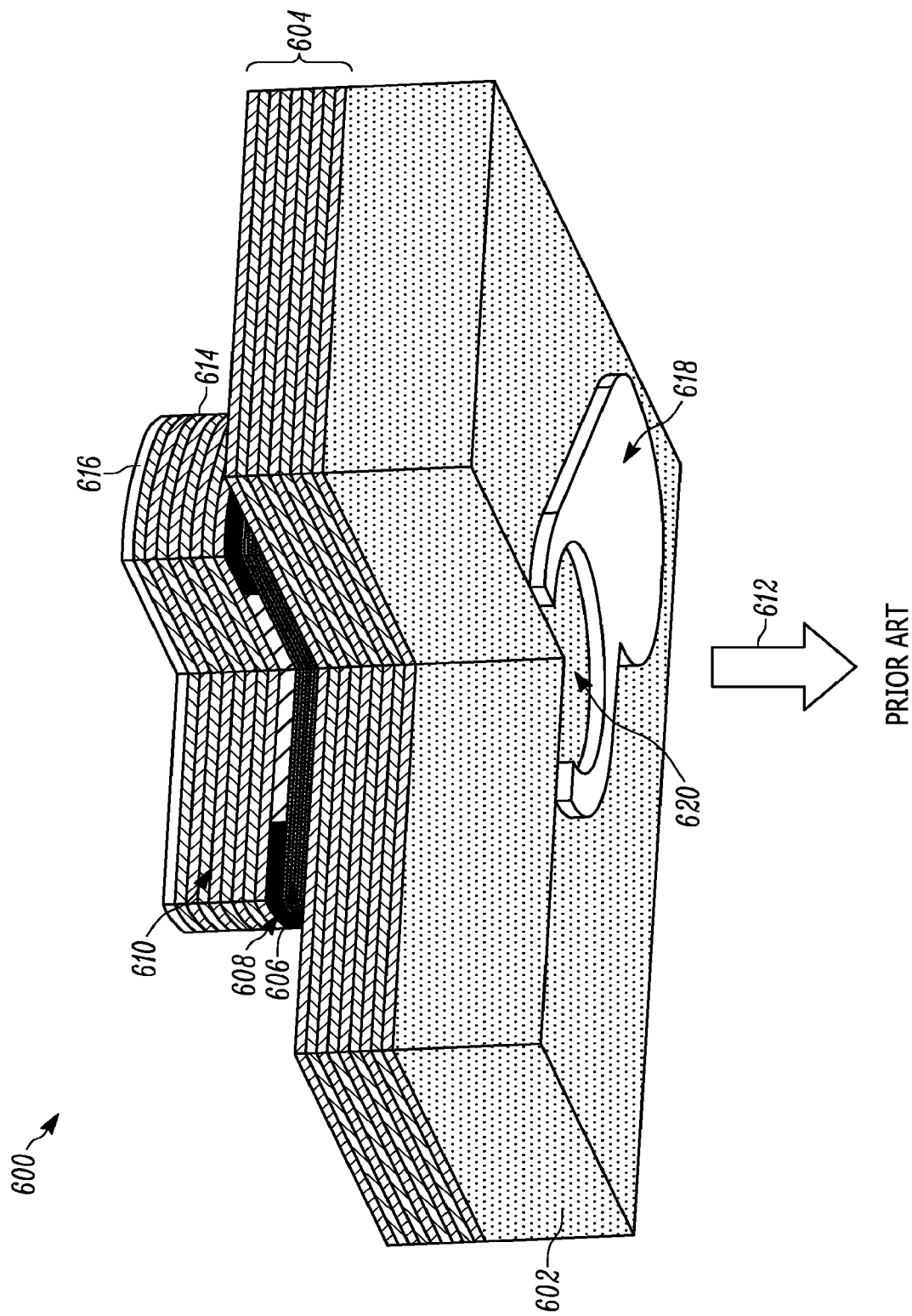
FIG. 6 illustrates a perspective view of a schematic diagram of the structure of a prior art bottom-emitting VCSEL laser used in some embodiments the LIDAR transmitter of the present teaching.

FIG. 6 illustrates a schematic diagram of a perspective view of a structure of a known bottom-emitting VCSEL laser 600 that can be used in the small angular divergence LIDAR transmitter of the present teaching. Note that the emission area of the VCSEL laser 600 typically ranges from a few microns in diameter for mW power operation, up to 100 microns diameter or more for 100 mW and greater CW power operation. Various embodiments of the present teaching use a variety of known VCSEL laser devices, including top-emitting VCSELs, bottom-emitting VCSELS, and various types of high-power VCSELs. The VCSELs is fabricated on a substrate 602 that can be GaAs, or other semiconductor material. An n-type distributed Bragg reflector (DBR) 604 is positioned on the substrate. An active region 606 is constructed on the n-type DBR 604, followed by an aperture 608 that can be made from an oxide material. A p-type Distributed Bragg Grating DBR 610 is then grown on the active region 606. Typically, the p-type DBR is highly reflecting, and the n-type DBR is partially reflecting, resulting in light output 612 from the bottom, substrate-side of the layer structure. The active region 606, oxide aperture 608 and p-type DBR 610 are formed in a mesa structure 614. A top contact 616 and a bottom contact 618 are used to provide an electrical current to the active region 606 to generate the output light 612. An oxide aperture 608 provides current confinement to the active region 606. The top contact 616 is p-type, and the bottom contact 618 is n-type. Emission apertures 620 are formed in the bottom contact 618 to allow the output light 612 to emerge from the bottom, substrate side of the bottom-emitting VCSEL 600. This type of VCSEL may be a single element, or multiple VCSELS can be fabricated as one- or two-dimensional arrays on the substrate 602.

Figure 7:
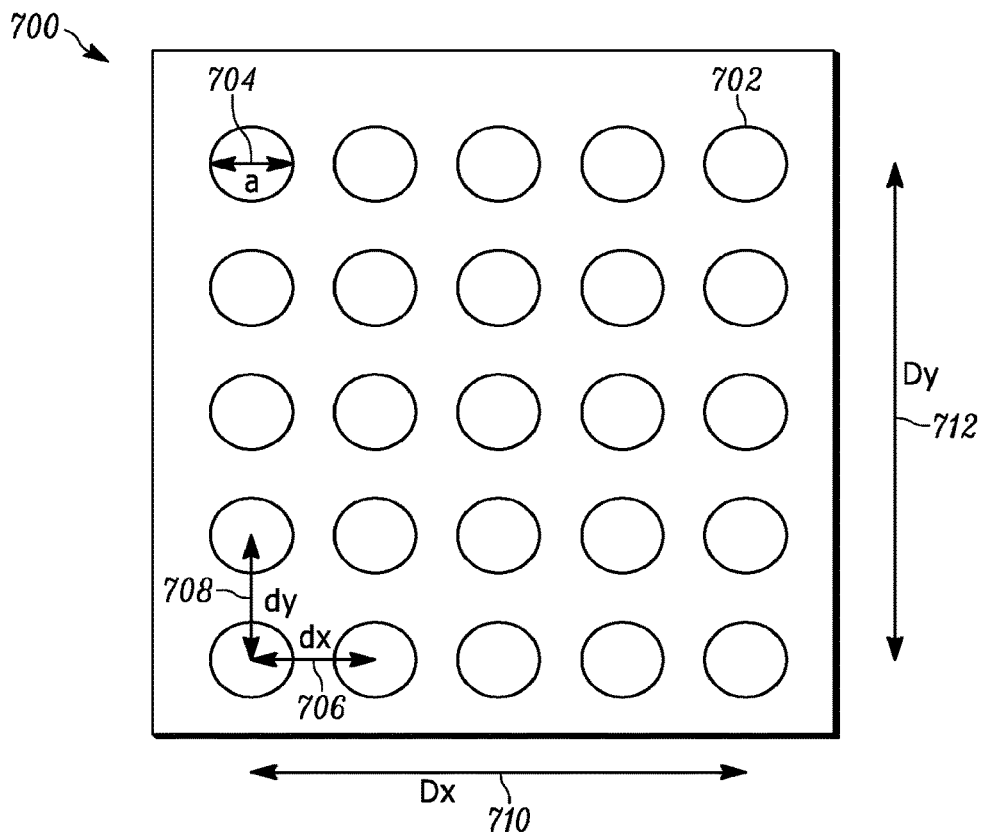
FIG. 7 illustrates a schematic diagram of an embodiment of a 2D monolithic VCSEL array with twenty-five separate laser emitters according to the present teaching.

FIG. 7 illustrates a schematic diagram of an embodiment of a 2D monolithic VCSEL array 700 with twenty-five separate laser emitters 702 of the present teaching. Each laser emitter 702 has an emission aperture 704 of diameter, a. Emission from each single laser emitter 702 substantially fills the full emission aperture 704. Each laser emitter 702, therefore, generates a laser beam with diameter, a, equal to the diameter of the emission aperture 704. The laser emitters 702 are spaced uniformly in the horizontal direction with a spacing dx 706. The laser emitters 702 are spaced uniformly in the vertical direction with a spacing dy 708. The overall size of the array, measured from the centers of the outermost lasers is distance Dx 710 in the horizontal direction and distance Dy 712 in the vertical direction. The actual chip size will be slightly larger than the distance Dx 710 and distance Dy 712.

Figure 8:
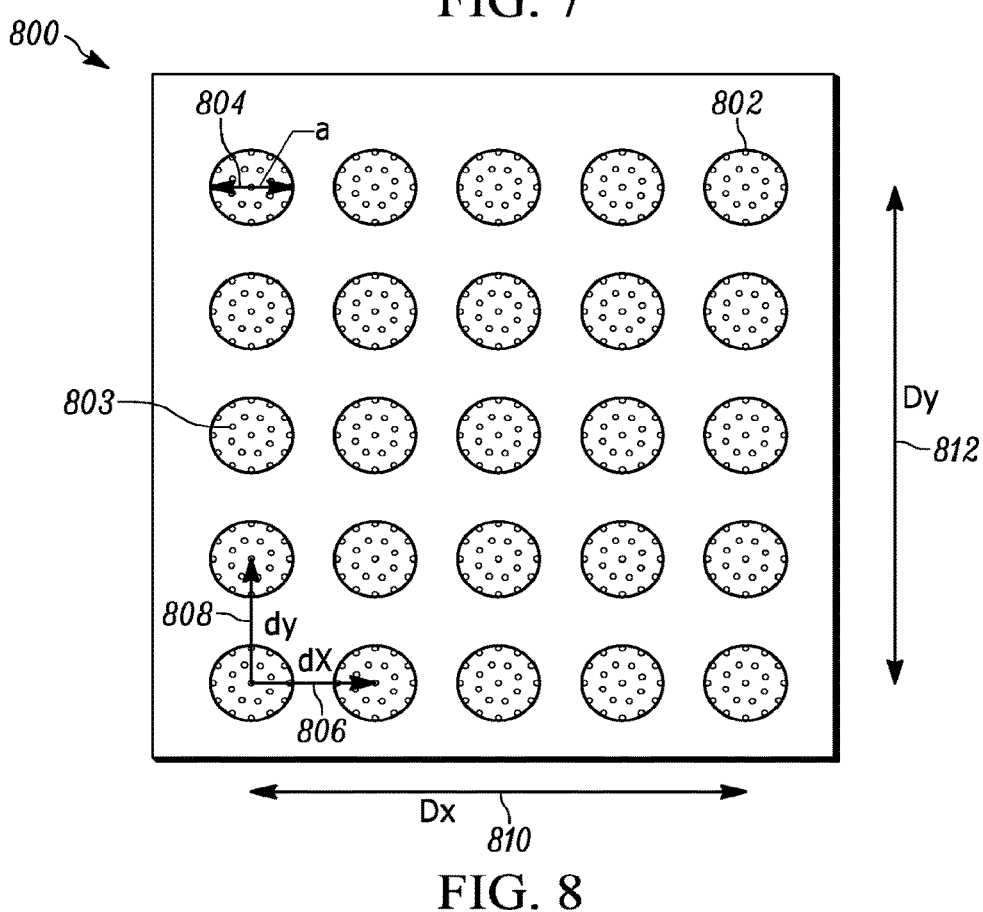
FIG. 8 illustrates a schematic diagram of an embodiment of a 2D monolithic VCSEL array with twenty-five separate laser emitters comprising sub-apertures according to the present teaching.

FIG. 8 illustrates a schematic diagram of an embodiment of a 2D monolithic VCSEL array 800 with twenty-five separate laser emitters 802 of the present teaching. Each laser emitter 802 has an emission aperture 804 of diameter, a. Each laser emitter 802 is formed from multiple sub-apertures 803 that are connected electrically to act as one, and whose combined emission is contained within an emission aperture 804 of dimension, a. Thus, each laser emitter 802 generates a laser beam with diameter, a, equal to the diameter of the emission aperture 804. The laser emitters 802 are spaced uniformly in the horizontal direction with a spacing 806, dx. The laser emitters 802 are spaced uniformly in the vertical direction with a spacing 808, dy. The overall size of the array measured from the centers of the outermost lasers is distance 810, Dx, in the horizontal direction and distance 812, Dy, in the vertical direction. The actual chip size will be slightly larger than the distance 810, Dx, and distance 812, Dy. FIG. 8 illustrates laser emitters with emission shapes that are circular. In various embodiments, the emitters may produce beams with various shapes. For example, oval, square, rectangular and various odd shapes may be realized. This emission width is the width of the shape in a particular direction and will determine the angular divergence of the LIDAR transmitter in that particular direction, as described further below.

Some embodiments of the present teaching utilize bottom-emitting high-power arrays of VCSELs with a single large aperture per laser, such as the configuration shown in FIG. 7. Other embodiments of the present teaching utilize top-emitting high-power arrays of VCSELs with a large aperture comprising sub-apertures as shown in FIG. 8. However, one skilled in the art will appreciate that the present teaching is not limited to these configurations of top- and bottom-emitting VCSELs and associated emission apertures.

Prior art systems generate a one-to-one mapping between each laser and a specific measurement point, and/or projected angle, using a single shared lens for all the transmitting elements. See, for example, U.S. Pat. No. 7,544,945 that describes utilizing five lasers together with a single projection lens to form five separate projected beams with distinct angular spacing. The single projection lens provides two functions. The first function is to collimate the laser beam to determine the spot size of the beam in the far field. The spot size is set by the requirements of the LIDAR system at the required range. For example, a typical requirement for LIDAR system is that the laser spot at 100 m should be smaller than 0.5 m in diameter. This is equivalent to a full angle divergence of 5 mrad. The second function of the optical lens is to determine the full field-of-view for the projected laser beams which is set by the position of the two outermost beams in the far field at the range of the LIDAR system. The angular resolution between each measurement beam is then determined by the taking the full field-of-view divided by the N-1 the number of lasers in each direction.

One disadvantage of prior art single projection lens LIDAR systems is that they fail to account for the finite size of the emission aperture of the laser emitter. In systems that utilize a single projection lens, the lasers are placed at the focal point of the single projection lens in order to collimate the laser beams.

Figure 9:
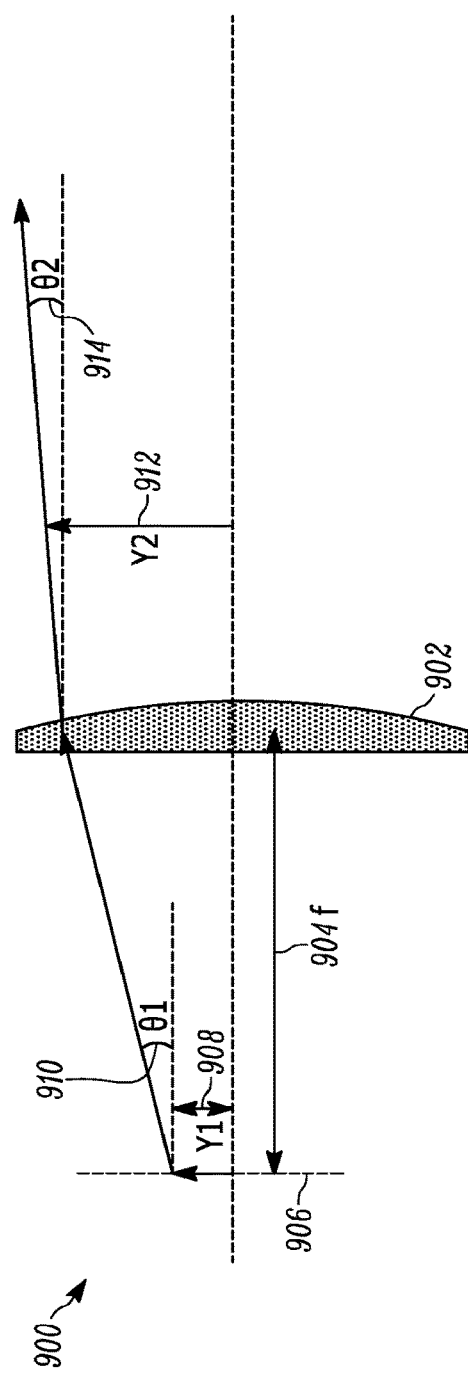
FIG. 9 illustrates a schematic diagram illustrating light projected by a single emitter in a single lens LIDAR transmitter system according to the present teaching.

FIG. 9 illustrates a schematic diagram of light projected by a single lens LIDAR transmitter system 900. A lens 902 is placed at the focal length 904, f, relative to a plane 906 of a laser emitter. The distance 908, y1, represents the half of the emission width, the radius of the emitted laser beam. The angle 910, θ1 is the divergence of the emitted laser beam. From classical optics, the optical invariant rule tells us that the product of the beam radius and the beam divergence will be a constant. Therefore, the laser beam radius 912 after the lens is now y2, and the divergence 914 is θ2, where: $\theta_1 * y_1 = \theta_2 * y_2$. And from geometry, we see that the focal length 904, f, is related to y2, by the equation: $y_2 = f * \theta_1$.

Combining these two equations, we can then obtain the relationship $\theta_2 = y_1/f$. This relationship indicates that the angular divergence of the collimated beam is directly related to the focal length of the lens in a single lens LIDAR transmitter. The relationship also shows how the angular divergence depends on the width of the emitter size and associated radius for a circular shaped aperture. This relationship sets a minimum size constraint on the lens focal length required for a particular size of the emitting laser beam. For example, a typical high-power VCSEL has a round shape with an effective emission diameter of 100 microns. Therefore, $y_1$ equals 50 microns. To meet the criteria described herein for a 100 m LIDAR system, there should be less than 5-mrad divergence (full angle). The minimum focal length of the projection lens system is then 20 mm.

The examples described here generally assume a circularly symmetric system with a round emission shape and spherical lenses. However, it will be clear to those skilled in the art that the present teachings apply to emission shapes and lens shapes having other shapes and geometries. The width and focal length relationships described then apply in a particular direction. For example, rectangular emitters and/or lens systems that comprise cylindrical and/or spherical lenses can be used. The choices will depend on the desired beam patterns at the target range. For example, a system may be constructed with a different field-of-view and angular resolution in the horizontal and vertical directions.

In the above analysis, we have used classical optics formulations that assume small angles and thin lenses. If dimensions or angles are large, which is common in compact transmitter designs, the classical optics formulations would not necessarily provide sufficient accuracy of the predicted angular divergence and field-of-views obtained. In these cases, full three-dimensional electromagnetic models are preferred.

Figure 10:
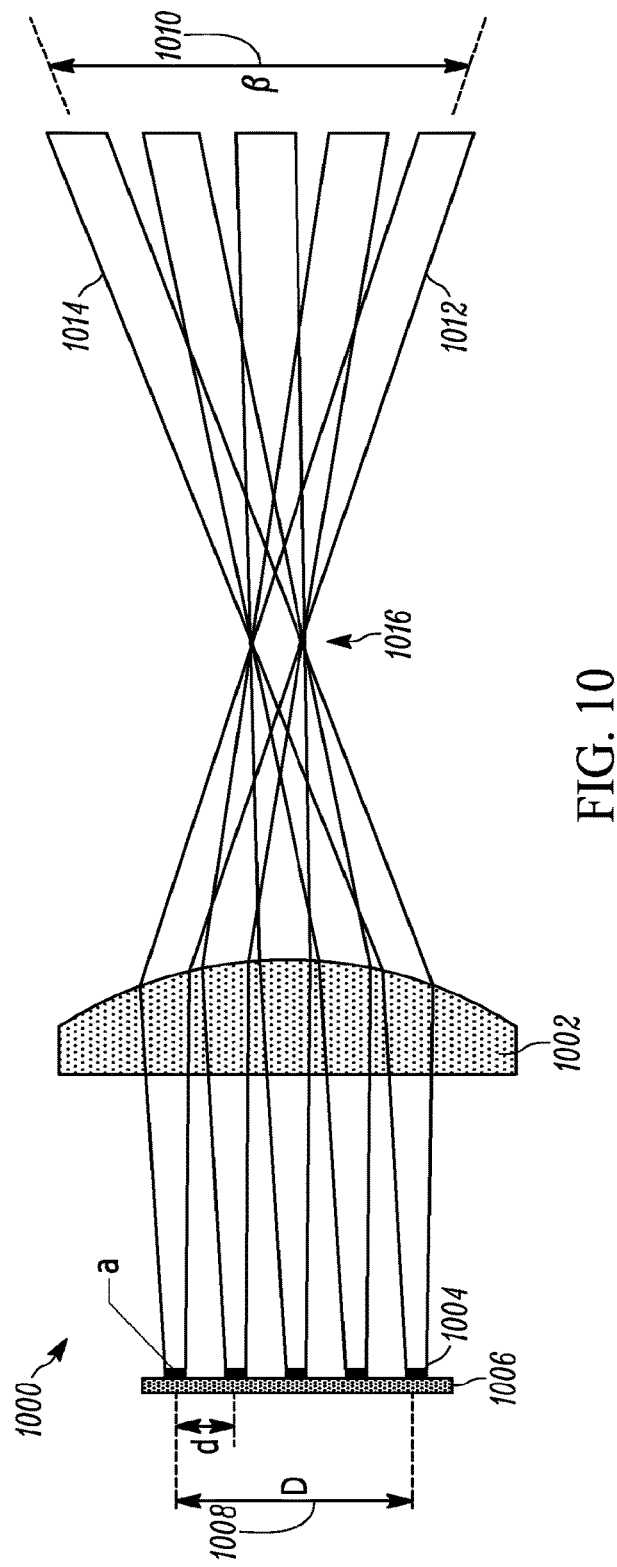
FIG. 10 illustrates a schematic diagram of light projected by multiple emitters in a single lens LIDAR transmitter system according to the present teaching.

FIG. 10 illustrates a schematic diagram 1000 of light projected by multiple emitters in a single lens LIDAR transmitter system. A single projection lens 1002 is situated a distance from an array of VCSEL laser emitters 1004 on a substrate 1006. FIG. 10 illustrates the light projected by an arrayed laser transmitter system fully representing the VCSEL laser emitters 1004 as being finite sources with emission apertures of width, a. In FIG. 10, the center-to-center distance 1008, D, of the outermost lasers, maps to an angular field-of-view 1010, β, which is the center-to-center angular offset between the two outermost projected beams 1012, 1014. Each vertical position in the focal plane of the lens, where the lasers are located, maps to a unique angular projection angle. As such, for a source of finite emission aperture of dimension, a, a beam divergence will result approximately equal to a*(β/D).

Referring to FIG. 10, a typical spacing, d, for a VCSEL array would be 250 microns, so the center-to-center distance 1008, D, of the outermost emitters would be 1.25 mm. Assuming an emission aperture diameter, a, of 100 microns and a maximum divergence full angle of 5 mrad, we can calculate that the full field-of-view 1010 of the lens, β, cannot be greater than 62.5 mrad (3.58 degrees). If a field-of-view larger than 3.58 degrees is generated by the lens, then the divergence of the laser beam due to the finite size of the laser emission area will exceed 5 mrad full angle.

The inherent divergence of the VCSEL laser emitters of FIG. 10 is approximately two degrees. This low divergence keeps the laser beams largely separated as they emerge from the plane of the array substrate 1006 and proceed through the lens toward the far field, except at the point 1016 on the right side of the lens where they all cross over to form a beam waist.

Figure 11A:
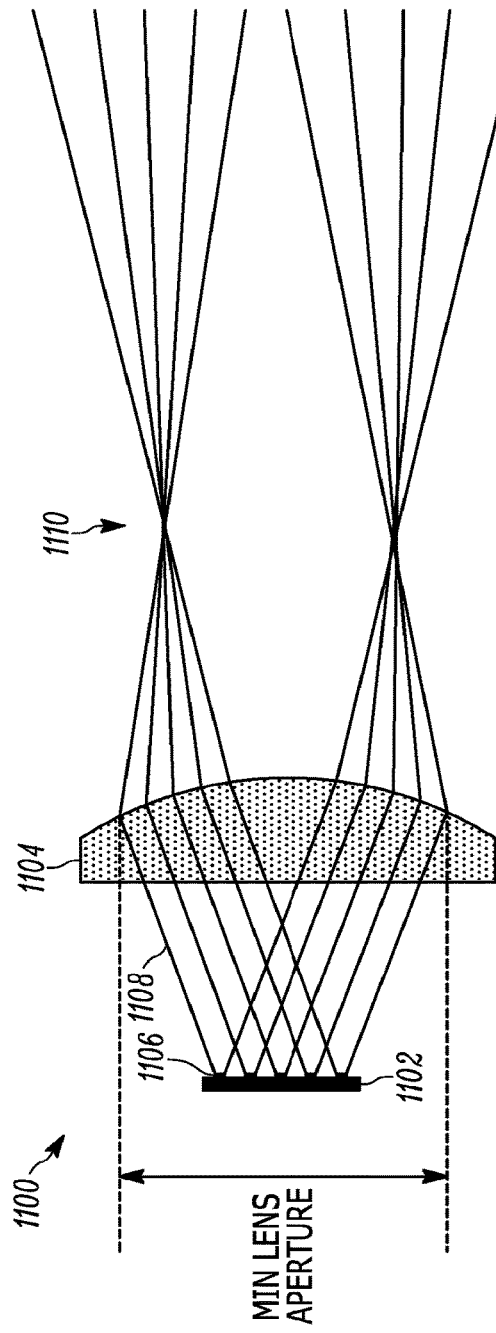
FIG. 11A illustrates a schematic diagram showing an expanded view of light projected by multiple emitters in a single lens LIDAR system with high angular divergence emitters.
Figure 11B:
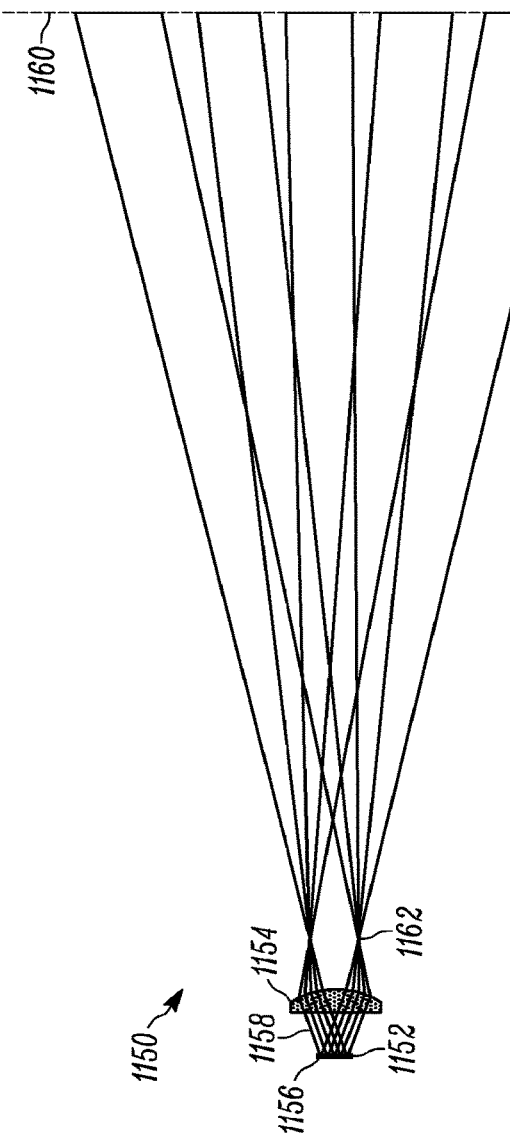
FIG. 11B illustrates a schematic diagram illustrating a condensed-view of light projected by the system of FIG. 11A that shows the far field.

FIGS. 11A-B show a more typical, larger, beam divergence configuration. FIG. 11A illustrates a schematic diagram 1100 of an expanded view of light projected by multiple emitters in a single lens LIDAR system with high angular divergence emitters. FIG. 11B illustrates a schematic diagram 1150 of a condensed-view of light projected by the system of FIG. 11A to illustrate the far field. In both figures, an emitter array 1102, 1152 illuminates a respective lens 1104, 1154. Each emitter 1106, 1156 produces a laser beam 1108, 1158 with a relatively broad divergence as compared to the example shown in FIG. 10. The lenses 1104, 1154 converge the respective emitted beams 1108, 1158 to produce a beam waist 1110, 1162. FIGS. 11A-B show how the laser beams would look for a more typical VCSEL divergence of ~20 degrees. In this configuration, the beams 1108, 1158 overlap significantly at the lens 1104, 1154 as shown. And, the position 1160 at which the beams fully separate is much further from the lens 1154 as compared to the example of FIG. 10, as is shown in FIG. 11B. We can see that the inherent divergence of the VCSEL, along with the size of the array, will determine the minimum lens aperture for this single lens system. The larger the divergence, and the larger the size of the array, the larger the minimum aperture required to truncate the laser beams emitted by the VCSEL array.

Thus, for the LIDAR transmitter, we then have two main causes of divergence in the transmit beam at the target range in the far field that comprises the series of laser beams emitted by the apertures and/or sub-apertures of the VCSEL array. One source of final beam divergence is a function of the size of the laser emission area and the focal length of the lens system. The second source of final beam divergence is a function of the laser emission size and the projected field-of-view of the lens. One feature of the present teaching is the recognition that different lens systems can be designed with identical focal lengths but with different projected field-of-views.

A method of light detection and ranging according to the present teaching includes generating a plurality of optical beams that can be multiwavelength optical beams. A first lens is positioned in an optical path of the plurality of optical beams at a distance from at least one of the plurality of light emitters that is less than a focal length of the first lens. The first lens converges the plurality of optical beams to a converged optical beam having a beam waist. A second lens is positioned in the optical path of the converged optical beam so that it projects the converged optical beam to a target range. The position of the second lens can be further selected to decrease an angular resolution of the LIDAR transmitter at the target range. Also in some methods, a size of an aperture of the second lens is chosen to be equal to a size of the beam waist of the converged optical beam. The position of the second lens and an emission width of at least one of the plurality of light emitters are selected to provide a desired field-of-view of the LIDAR transmitter at the target range.

Figure 12:
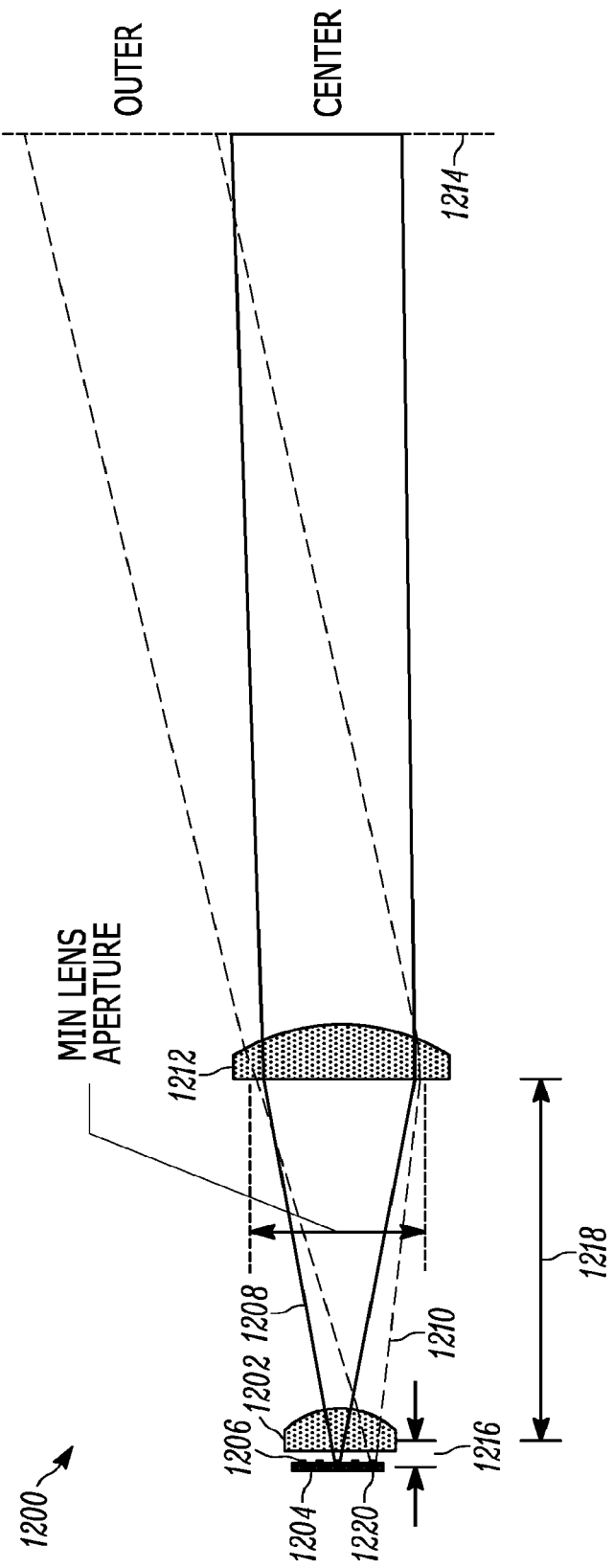
FIG. 12 illustrates a schematic diagram of an embodiment of a two-lens illuminator that projects light in a small angular divergence LIDAR transmitter according to the present teaching.

FIG. 12 illustrates a schematic diagram of an embodiment of a lens system that projects light in a small angular divergence LIDAR transmitter 1200 of the present teaching. A first lens 1202 is placed in very close proximity to the VCSEL laser array 1204 that comprises multiple individual laser emitters 1206. The first lens 1202 may be placed closer to the emitters than a distance equal to the focal length of the first lens. The figure illustrates laser beams 1202, 1210 that are emitted by the individual laser emitters 1206. Only the center laser beam 1208 and an outer laser beam 1210 are shown. But all the laser emitters 1206 in the array may produce laser beams, as desired.

A second lens 1212 is positioned after the first lens 1202 and projects the laser beams 1208, 1210 to a far field position 1214 where the laser beams from individual transmitters are nominally separated. The first lens 1202 is placed at a particular distance 1216 from the array that produces a desired convergence of the laser beams 1208, 1210 at the second lens 1212. The second lens 1212 is placed at a particular distance 1218 from the first lens 1202 to produce a desired field-of-view at a desired far field position 1214, the target range.

As shown in FIG. 12, the first lens 1202 acts to converge the beams, turning the laser beam 1210 inward from the outermost VCSEL emitter 1220, which produces a smaller minimum lens aperture for the second lens 1212 as compared to a single lens system. This means the physical transmitter can be smaller in size because the minimum lens aperture of the second lens 1212 determines the size of the largest lens in the system. In this example, the beam waist produced by the converging first lens 1202 is formed at the position of the second lens 1212, and the aperture of the second lens is equal to the size of the beam waist. Each of the beams produced by the emitters fills the aperture of the second lens.

This two-lens configuration, when compared to a single lens system, with identical focal lengths, has significantly improved performance while maintaining the required low divergence of the output beams. This two-lens configuration also advantageously minimizes the size of the LIDAR transmitter. In addition, the projection angle of the two-lens system can be varied without changing the overall focal length of the lens system. The curvatures of the lens surfaces in this two-lens system can be adjusted to provide an additional degree of freedom that maintains focal length, while enabling different field-of-view. This additional degree of freedom also allows the adjustment of the field-of-view to minimize as necessary the divergence of the individual emitted laser beams, while maintaining an overall compact size for the transmitter.

As described herein, the divergence of the transmitted laser beams of the individual laser emitters is a critical factor in determining the resulting field-of-view of the lens system. Once the maximum field-of-view is determined based on the maximum divergence, the angular resolution of the system is then determined by the spacing between individual lasers in the array, which cannot be smaller than the individual emission width.

The small angular divergence LIDAR transmitter of the present teaching can be configured in a variety of designs that realize particular field-of-views and angular resolutions that are required to address the needs of the particular sensor application. For example, some automotive applications require a maximum divergence that is five milliradians half angle. Field-of-view, divergence and aperture size are all related. Furthermore, the emitter emission width, emitter pitch, and array size are critical. In one particular embodiment, a sixteen-by-sixteen-element two-dimensional array with an emission width of 125 micron and laser pitch of 250 micron, and a maximum half-angle divergence of 5 mrad is configured for a field-of-view of 18.3 degrees by using a two lens system in which the first lens is placed at a position less than the focal length of the first lens from the array. A larger field-of-view using the present teachings is possible, for example using a smaller emission width.

The angular resolution is determined by dividing the field-of-view by the array size. Using the smallest possible emission-width emitters means more elements in the array, and hence the smallest possible angular resolution. One particular embodiment with a sixteen-element array in one dimension, an emission width of 50 micron, a laser pitch of 250 micron, and a maximum half-angle divergence of 5 mrad is configured for a field-of-view of 45.8 degrees. The angular resolution for this configuration is 2.8 degrees. A smaller resolution is possible, for example, using more array elements with a smaller pitch.

In various embodiments, the field-of-view and the angular resolution may be different in different directions, for example, in some systems, the horizontal field-of-view and angular resolution are different from the vertical field-of-view and angular resolution.

Figure 13:
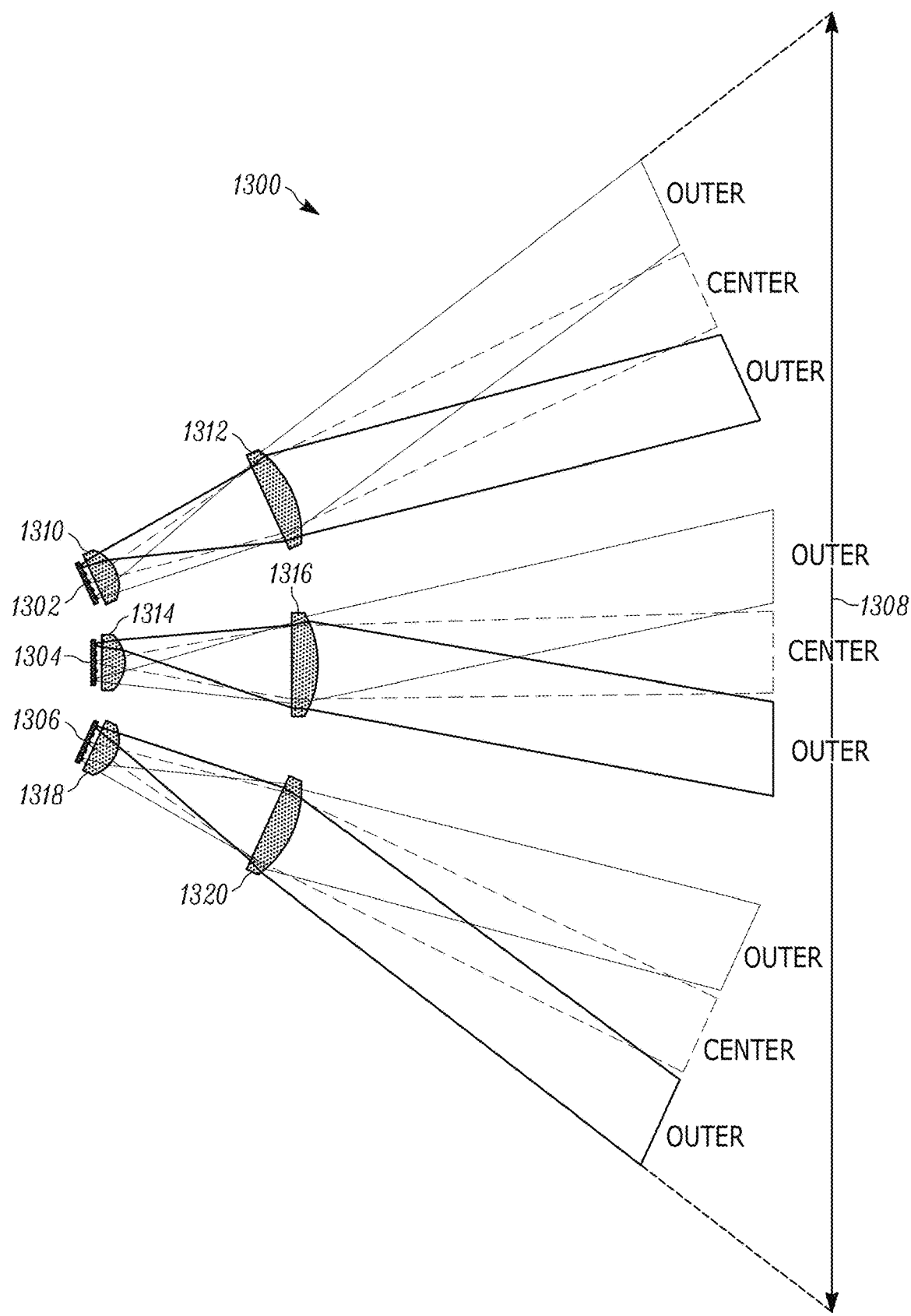
FIG. 13 illustrates a schematic diagram of an embodiment of a multiple-transmitter-array small angular divergence LIDAR transmitter according to the present teaching.

One feature of the present teaching is that the compact size of the two-lens projection system, and other design features, allow for multiple transmitter arrays to be combined into a single transmitter system. FIG. 13 illustrates a schematic diagram of an embodiment of a lens system that projects light in a small angular divergence LIDAR transmitter 1300 utilizing multiple transmitter arrays 1302, 1304, 1306 according to the present teaching. In FIG. 13, several transmitter arrays 1302, 1304, 1306 are used to cover a combined wider field-of-view 1308. For example, the first array 1302 has a first lens 1310 and second lens 1312; the second array 1304 has a third lens 1314 and fourth lens 1316; and the third array 1306 has a fifth lens 1318 and a sixth lens 1320. The individual VCSEL emitters each use a transmitter arrays 1302, 1304, 1306, and the placement of the transmitter arrays 1302, 1304, 1306 in three dimensional space (x, y, z) allows the beams to be combined in a desired pattern, such as an overall uniform pattern in the far field or a pattern with desired overlap or gaps.

For example, the positions of the transmitter arrays 1302, 1304, 1306 may be chosen so that the pattern of beams at the target range are arranged so the beams from the first transmitter array 1302 and the beams from the second transmitter array 1304 form a gap at the target plane. Alternatively, the positions of the transmitter arrays 1302, 1304, 1306 may be chosen so that the pattern of beams at the target range are arranged so the beams from the first transmitter array 1302 and the beams from the second transmitter array 1304 overlap at the target plane. In addition, the positions of the transmitter arrays 1302, 1304, 1306 may be chosen so that the pattern of beams at the target range are arranged so the beams from the first transmitter array 1302 and the beams from the second transmitter array 1304 form a uniform pattern of light at the target plane. It will be clear to those with skill in the art that the relative positions of the transmitter arrays, and associated optical lenses that converge and project the multiple beams that emerge from the transmitter arrays allow a variety of patterns to be projected at the target plane.

In some embodiments, the multiple transmitter arrays are used to cover a wider, or narrower, field-of-view by physically adjusting the position (x, y, z) and pointing angle of the individual transmitters, using all six dimensions to produce a desired pattern of laser beams at the target range. The various patterns of laser beams at the target range produce associated desired measurement point clouds when utilized in a LIDAR system.

In one embodiment, at least two transmitter arrays are positioned so that the beams substantially overlap at the target range. In this embodiment, the field-of-view of a two-transmitter system is the same as the field-of-view of each transmitter array and lens system. Systems with more than two arrays can also be configured with substantially completely overlapping patterns at the target range. Such an arrangement leads to improved angular resolutions. Embodiments of the present teaching using multiple emitter arrays are capable of achieving angular resolution of less than 0.25 degrees using state-of-the-art emitter array technology.

Figure 14A:
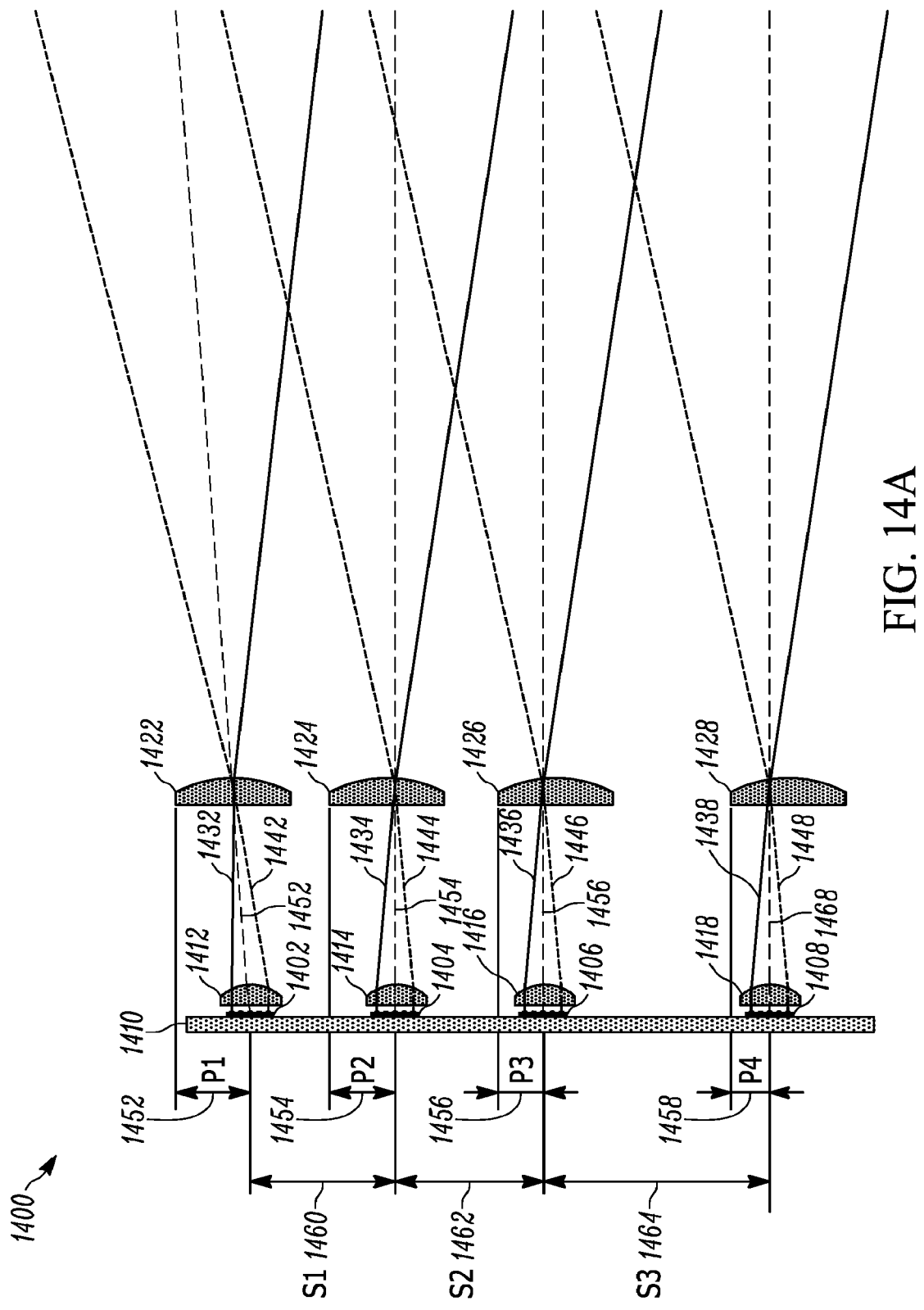
FIG. 14A illustrates a schematic diagram of an expanded view of a small angular divergence LIDAR transmitter illuminator utilizing multiple transmitter arrays on a single substrate according to the present teaching.

One feature of the present teaching is that multiple transmitter arrays can be placed on a single substrate. Each transmitter array can have a different shape and spacing, and the spacing between each transmitter array can also be varied on the substrate. FIG. 14A illustrates a schematic diagram of an expanded view an embodiment of a lens system that projects light in a small angular divergence LIDAR transmitter utilizing multiple transmitter arrays on a single substrate of the present teaching.

Figure 14B:
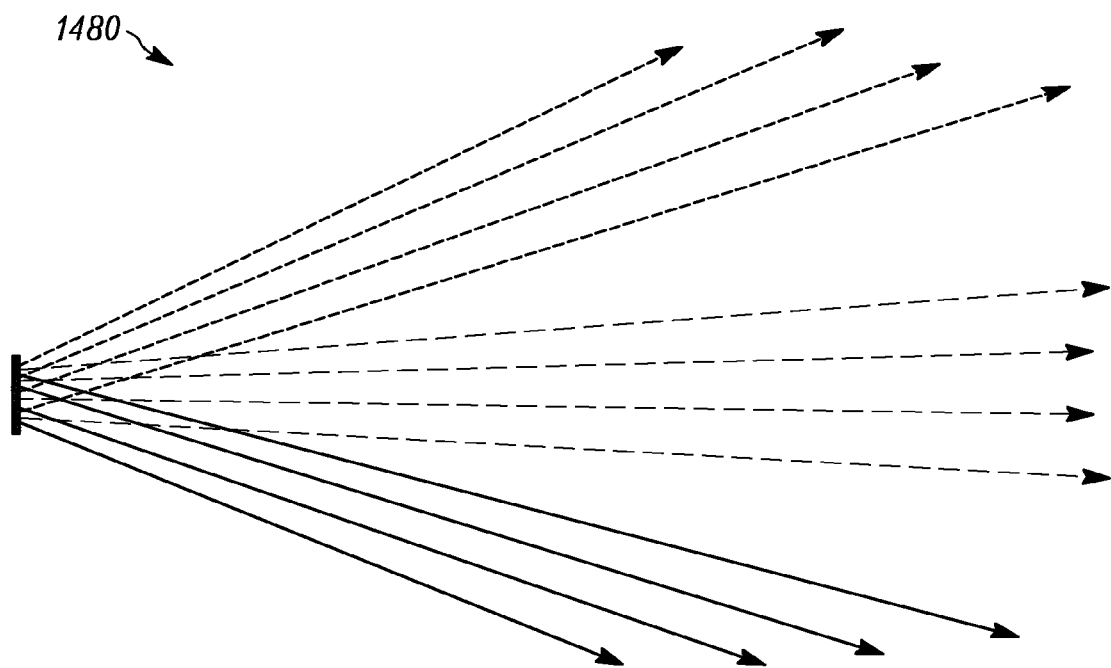
FIG. 14B illustrates a schematic diagram of a condensed-view of the small angular divergence LIDAR transmitter of FIG. 14A.

FIG. 14B illustrates a schematic diagram of a condensed-view of the embodiment of a lens system that projects light in a small angular divergence LIDAR transmitter of FIG. 14A. Multiple transmitter arrays 1402, 1404, 1406, 1408 are positioned on a common substrate 1410. Each transmitter array 1402, 1404, 1406, 1408 has an associated first lens 1412, 1414, 1416, 1418, and second lens 1422, 1424, 1426, 1428. For clarity, FIGS. 14A-B do not show the full diverging laser beams emitted by each VCSEL emitter, instead a single ray from the center of three VCSEL emitters are shown to illustrate the concept of the present teaching. For each transmitter array 1402, 1404, 1406, 1408, a single ray from a top outer emitter 1432, 1434, 1436, 1438 is shown. Also, for each transmitter array 1402, 1404, 1406, 1408, a single ray from a bottom outer emitter 1442, 1444, 1446, 1448 is shown. For each transmitter array 1402, 1404, 1406, 1408, a single ray from a central outer emitter 1452, 1454, 1456, 1458 is shown. The embodiment of FIG. 14A-B uses multiple array transmitters 1402, 1404, 1406 to increase the angular resolution. For a single transmitter array that uses a single VCSEL array on a substrate, the angular resolution is set by the field-of-view and the number of individual lasers emitters in the array. If denser angular resolution is desired, then multiple transmitters can be combined by overlapping the output beams in the far field at the desired range.

FIG. 14A illustrates the four transmitter arrays 1402, 1404, 1406, 1408 are attached to a common substrate 1410. While a common substrate is not necessary, it may be desired from an ease-of-assembly point-of-view. A variety of known common substrates may be used including those formed of a semiconductor material or a ceramic material. The common substrate may be a printed circuit board (PCB). In some embodiments, some of the transmitter arrays share one common substrate, for example a single semiconductor or ceramic carrier substrate. In other embodiments, the transmitter arrays are on a different common substrate, and then these two common substrates with arrays are placed on a third common substrate, for example a PC board.

Each of the four transmitter arrays 1402, 1404, 1406, 1408 has its own corresponding lens system comprising a first lens 1412, 1414, 1416, 1418 and a second lens 1422, 1424, 1426, 1428 corresponding to each transmitter array 1402, 1404, 1406, 1408, as shown. The laser beams emanating from the four transmitter arrays 1402, 1404, 1406, 1408 are overlapped and combined by adjusting the position of each of the four lens systems, comprising a first lens 1412, 1414, 1416, 1418 and a second lens 1422, 1424, 1426, 1428, relative to the position of their corresponding transmitter array 1402, 1404, 1406, 1408. The position of the second lens 1422, 1424, 1426, 1428 in each transmitter is shown at different radial offsets 1452, 1454, 1456, 1458 of P1, P2, P3, and P4 from the center of each corresponding transmitter array 1402, 1404, 1406, 1408. The first lens 1412, 1414, 1416, 1418 for each transmitter array 1402, 1404, 1406, 1408, can also be radially offset from the center of its associated transmitter array 1402, 1404, 1406, 1408. These offsets will allow each transmitter array 1402, 1404, 1406, 1408 to achieve a desired beam pattern at the target range. The exact radial offset values are chosen as needed to create a specific angular field pattern required by the LIDAR system at range. These radial offset values are not typically equal, but can be equal in particular embodiments.

One feature of the present teaching is that the lateral offset between the separate VCSEL arrays is not critical to determining the combined beam pattern at the target range. FIG. 14A illustrates lateral offsets 1460, 1462, 1464 with values of S1, S2, and S3. The exact values of S1, S2, and S3 for a LIDAR system with typical range of 100 m are not critical as the offset is not magnified with distance. In many embodiments, after only a few meters, the initial offset between arrays, represented by lateral offsets 1460, 1462, 1464 in the figure, is no longer significant compared to the offset due to the difference in projection angles that are set by the lens system for each array. The condensed-view of FIG. 14B shows a representation of how the beams combine in the far field.

Figure 15:
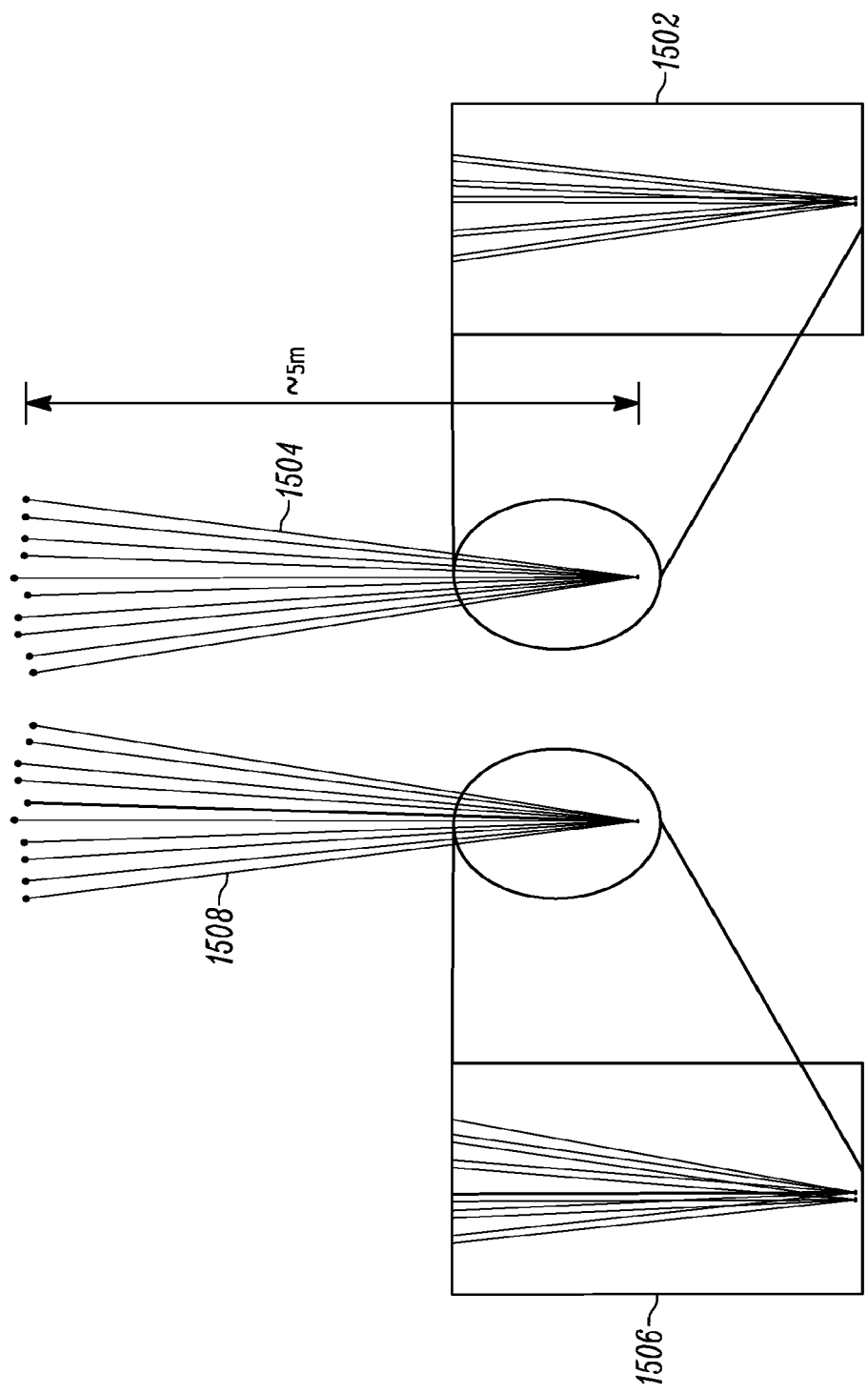
FIG. 15 illustrates schematic diagrams of scaled condensed views of embodiments of the small angular divergence LIDAR transmitters of the present teaching that indicate relative independence of the separation between transmitter arrays.

The relative independence of the projected field pattern for lens systems of the present teaching on the lateral offset of the arrays is illustrated by the configuration shown in FIG. 15. FIG. 15 illustrates schematic diagrams of scaled condensed and expanded views of embodiments of the small angular divergence LIDAR transmitters of the present teaching to show relative independence of the separation between transmitter arrays. FIG. 15 illustrates scale examples of laser beams being combined. An expanded-view and a condensed-view are shown. In one configuration, the initial lateral offset is equal to 10 mm in the expanded-view 1502 and in the condensed-view 1504. In another configuration 1506, the initial lateral offset is equal to 20 mm in the expanded view 1506 and in the condensed-view 1508.

In one particular embodiment, the laser beams for each VCSEL array are offset 2-degree, and there is a 1-degree offset between the transmitters such that the laser beams in the final beam pattern are uniformly offset by 1 degree in the far field. It can be seen at −5 m that there is no substantial difference in the far field patterns.

One feature of the present teaching is that the lens systems are capable of controlling both the divergence and the step size or position of the beams in the far field. Known LIDAR projection systems typically control step size only, and do not have the ability to control both the divergence and the step size or position of the beams in the far field independently. Furthermore, LIDAR systems of the present teaching can introduce additional beam control of the far field pattern by using additional optical elements. In particular, by positioning the first lens in close proximity to the transmitter array, the lens system of the present teaching provides a different step size independent of the focal of the optical system.

Figure 16:
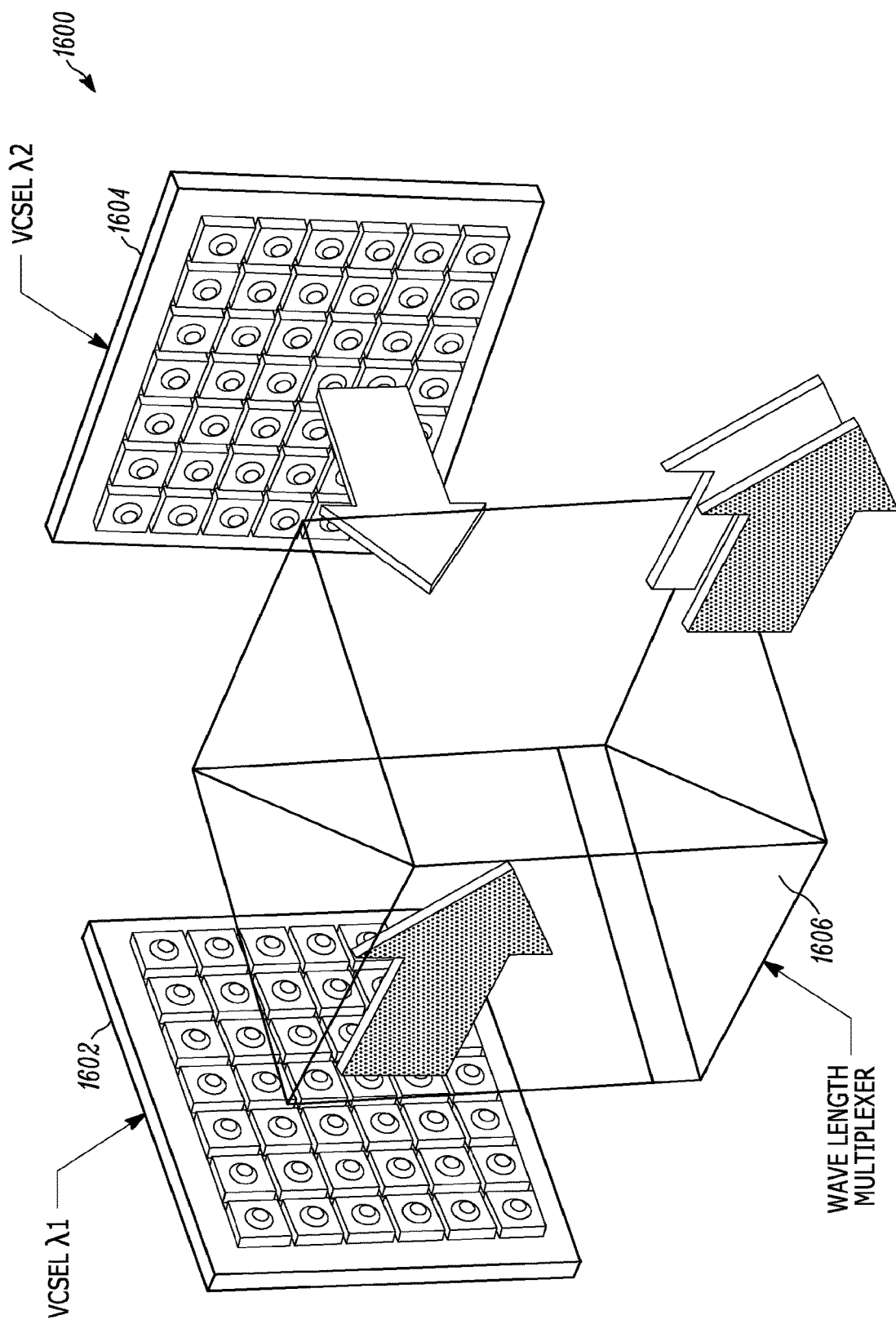
FIG. 16 illustrates an embodiment of an illuminator for a multi-wavelength LIDAR system using multiple transmitter arrays according to the present teaching.

One feature of the LIDAR systems of the present teaching is the ability to use wavelength to provide control over the laser beam pattern generated in the far field at the target range, and associated measurement point cloud of the LIDAR system. FIG. 16 illustrates an embodiment of an illuminator 1600 for a multi-wavelength LIDAR system using multiple transmitter arrays of the present teaching. In this embodiment, a plurality of surface emitting laser arrays comprising at least two groups of lasers with different wavelengths, VCSEL λ1 1602, and VCSEL λ2 1604 are used.

Another feature of the LIDAR systems of the present teaching is use of three-dimensional space. VCSEL λ1 1602 and VCSEL λ2 1604 are oriented in two surfaces that are orthogonal to each other. One skilled in the art will appreciate that a variety of three-dimensional (X, Y, and Z) degrees of freedom, and/or six-dimensional degrees of freedom (X, Y, Z, pitch, yaw, and roll) that include the angles of the VCSELs 1602, 1604 can be used in the LIDAR system of the present teaching. The beams are combined by use of a wavelength multiplexer 1806 that passes one wavelength, while reflecting the second wavelength.

The wavelength multiplexer 1606 can be realized, for example, by use of a thin film filter that allows the first wavelength to pass through undeflected, while the second wavelength is deflected at 45 degrees, and the output beams are combined. For simplicity, we have shown the multiplexer 1606 in the shape of cube formed by two equal prisms of triangular cross-section, where the thin film filter that reflects or passes the wavelengths is located at the central plane of the cube where the two triangular prisms touch.

Figure 17:
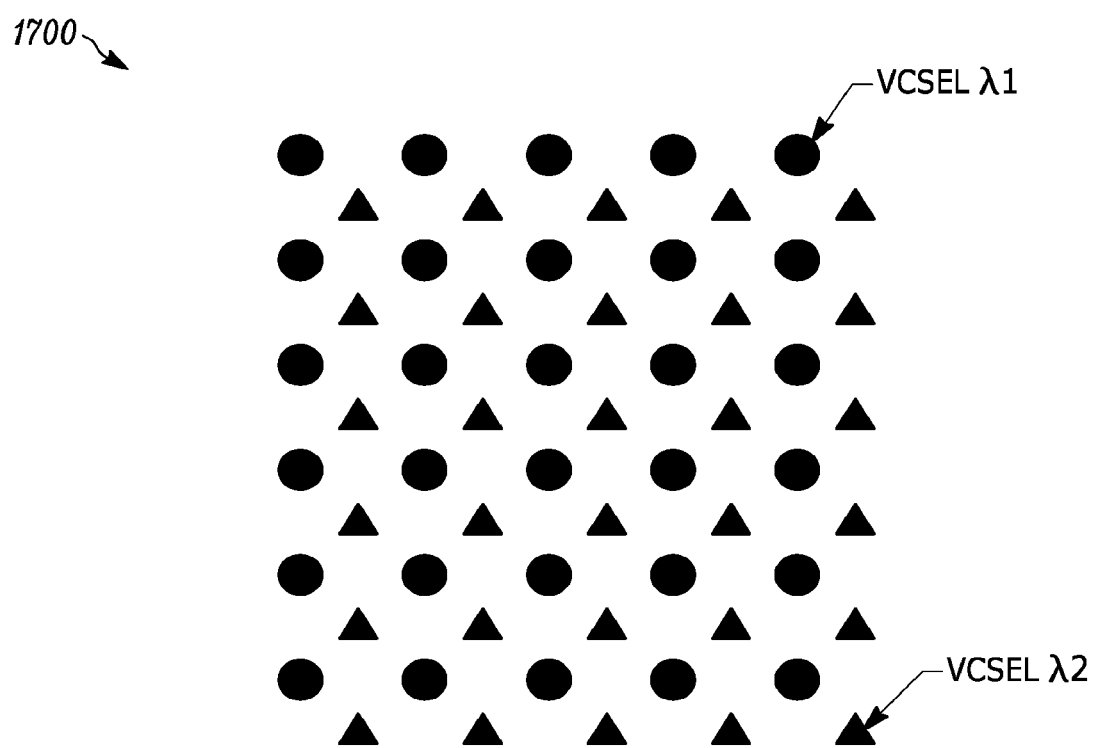
FIG. 17 illustrates a measurement point cloud that can be generated with the illuminator described in connection with FIG. 16.

The positions of the two substrates of VCSEL λ1 1602 and VCSEL λ2 1604 can be shifted laterally, relative to the wavelength multiplexer 1606, to create the desired overlap or interleaving of the two beams. FIG. 17 illustrates a measurement point cloud 1700 that can be generated with the illuminator embodiment of FIG. 16. It will be clear to those skilled in the art that the use of laser emitters with different wavelengths is not limited to the configurations illustrated here. Different wavelengths may be associated with each array, or different wavelengths may be emitted from a single array in various patterns. In addition, the arrays may be configured in a variety of 3D spatial patterns including different emission angles for each array.

One feature of the present teaching is that the optical projection system accounts for the finite emission area of the VCSEL lasers that form the emitter array. Known LIDAR projection optics model the laser source as a point source. In some embodiments of the LIDAR system of the present teaching, each of the adjacent VCSELs within the array have a separation pitch greater than the individual diameter of the emission area of each laser. The array of VCSEL lasers all share a common optical lens system with a clear aperture that is smaller than the projected combined diameter of the array of VCSEL lasers in free space. This is accomplished by a first lens that converges at least the outermost beams. In some embodiments, the first lens, which is the converging lens, is positioned adjacent to the VCSEL array at a distance that is shorter than the focal length of the first lens. The maximum angular field-of-view of the lens system is defined by the emission width of the laser, the optical system defining a divergence of the laser beam, and the separation pitch of the lasers in the array.

In some embodiments, multiple transmitter arrays are overlapped in free space to create a denser angular resolution than can be created with a single transmitter with the same VCSEL array dimensions. Each transmitter array has an associated first lens. The first lenses of each individual transmitter array are radially offset to produce a different angular pattern. The radial offsets of each lens system do not need to be the same. The transmitter arrays are located on a common substrate and the distances between the various transmitter arrays do not need to be the same. In embodiments with multiple transmitters, the wavelengths of the individual VCSELS that comprise the transmitter array and/or each transmitter array may be the same or different. In embodiments of the LIDAR system of the present teaching that use different wavelengths, a wavelength sensitive element may be used to further converge or diverge the beams in the far field based on their wavelength.

A method of light detection and ranging according to the present teaching includes providing a first transmitter array comprising a first plurality of light emitters that generate a first plurality of optical beams that can be multiwavelength optical beams. A first lens is positioned in an optical path of the first plurality of optical beams at a distance from at least one of the plurality of light emitters that is less than a focal length of the first lens so that the first lens converges the first plurality of optical beams to form a first converged optical beam with a beam waist. A second lens is positioned in the optical path of the first converged optical beam so that it projects the first converged optical beam to a target range. The position of the second lens and an emission width of at least one of the first plurality of light emitters are selected to provide a desired field-of-view of the projected first converged optical beam at the target range.

The method also includes providing a second transmitter array comprising a second plurality of light emitters that generate a second plurality of optical beams that can be multiwavelength optical beams. A third lens is positioned in an optical path of the second plurality of optical beams at a distance from at least one of the second plurality of light emitters that is less than a focal length of the third lens so that the third lens converges the second plurality of optical beams to form a second converged optical beam with a beam waist. A fourth lens is positioned in the optical path of the second converged optical beam so that the fourth lens projects the second converged optical beam to a target range. The position of the fourth lens and an emission width of at least one of the second plurality of light emitters are selected to provide a desired field-of-view of the projected second converged optical beam at the target range. A position of the first transmitter array and a position of the second transmitter array are chosen to provide a desired field-of-view of the LIDAR transmitter at the target range.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A light detection and ranging (LIDAR) transmitter comprising:
 a) a substrate;
 b) a first transmitter array attached to the substrate that generates a first array of laser beams;
 c) a first lens positioned in an optical path of the first array of laser beams and configured to converge the first array of laser beams along the optical path;
 d) a second lens positioned in the optical path of the converged first array of laser beams, wherein a position of a center of the second lens has a first radial offset from a center of the first transmitter array;
 e) a second transmitter array attached to the substrate with a lateral offset from the first transmitter array that generates a second array of laser beams;

f) a third lens positioned in an optical path of the second array of laser beams and configured to converge the second array of laser beams along the optical path; and g) a fourth lens positioned in the optical path of the converged second array of laser beams, wherein a position of a center of the fourth lens has a second radial offset from a center of the second transmitter array, wherein the lateral offset, the first radial offset, and the second radial offset are chosen to provide a desired beam pattern at a target range.

2. The LIDAR transmitter of claim 1 wherein the desired beam pattern comprises a step size between beam centers and a divergence of a beam.

3. The LIDAR transmitter of claim 2 wherein the lateral offset, the first radial offset, and the second radial offset are chosen such that the step size between beam centers of the desired beam pattern at the target range is independent of the divergence of the beam of the desired beam pattern at the target range.

4. The LIDAR transmitter of claim 2 wherein the lateral offset, the first radial offset, and the second radial offset are chosen such that the desired beam pattern at the target range comprises beams uniformly offset by one degree.

5. The LIDAR transmitter of claim 4 wherein the target range comprises a far field range.

6. The LIDAR transmitter of claim 1 wherein the desired beam pattern comprises a beam pattern that is nominally independent of the lateral offset at a far field range.

7. The LIDAR transmitter of claim 1 wherein the desired beam pattern comprises a substantially overlapped pattern of the first array of laser beams and the second array of laser beams.

8. The LIDAR transmitter of claim 1 wherein the desired beam pattern comprises an interleaved pattern of the first array of laser beams and the second array of laser beams.

9. The LIDAR transmitter of claim 1 wherein the desired beam pattern comprises an angular resolution of approximately 2.8 degrees and a field-of-view of approximately 45.8 degrees.

10. The LIDAR transmitter of claim 1 wherein the first transmitter array operates at a first wavelength and the second transmitter array operates at a second wavelength that is different from the first wavelength.

11. The LIDAR transmitter of claim 1 wherein the first transmitter array comprises a shape that is different from a shape of the second transmitter array.

12. The LIDAR transmitter of claim 1 wherein the first transmitter array comprises an element spacing that is different from an element spacing of the second transmitter array.

13. The LIDAR transmitter of claim 1 wherein at least one of the first and second transmitter array comprises a VCSEL array.

14. The LIDAR transmitter of claim 1 wherein the substrate comprises a semiconductor substrate.

15. The LIDAR transmitter of claim 1 wherein the substrate comprises a ceramic substrate.

16. The LIDAR transmitter of claim 1 wherein the substrate comprises a printed circuit board substrate.

* * * * *